(12) United States Patent
Lai et al.

(10) Patent No.: US 11,834,360 B2
(45) Date of Patent: Dec. 5, 2023

(54) INTEGRATED DEVICE AND METHOD FOR TREATING TOXIC AND REFRACTORY WASTEWATER

(71) Applicant: SICHUAN UNIVERSITY, Chengdu (CN)

(72) Inventors: Bo Lai, Chengdu (CN); Heng Zhang, Chengdu (CN); Yang Liu, Chengdu (CN); Zhaokun Xiong, Chengdu (CN); Chuanshu He, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 10 days.

(21) Appl. No.: 18/021,184

(22) PCT Filed: Jan. 15, 2021

(86) PCT No.: PCT/CN2021/071970
§ 371 (c)(1),
(2) Date: Feb. 14, 2023

(87) PCT Pub. No.: WO2022/037005
PCT Pub. Date: Feb. 24, 2022

(65) Prior Publication Data
US 2023/0242430 A1 Aug. 3, 2023

(30) Foreign Application Priority Data
Aug. 15, 2020 (CN) .......................... 202010821497.9

(51) Int. Cl.
*C02F 9/00* (2023.01)
*B01D 21/02* (2006.01)
(Continued)

(52) U.S. Cl.
CPC ................ *C02F 9/00* (2013.01); *B01D 21/02* (2013.01); *C02F 1/5281* (2013.01); *C02F 1/66* (2013.01);
(Continued)

(58) Field of Classification Search
None
See application file for complete search history.

(56) References Cited

FOREIGN PATENT DOCUMENTS

| CN | 101979330 B | 5/2012 |
|----|-------------|--------|
| CN | 102276018 B | 1/2013 |

(Continued)

OTHER PUBLICATIONS

Machine translation of CN # 109607985A, 2019, pp. 1-10. (Year: 2019).*

(Continued)

*Primary Examiner* — Clare M Perrin
(74) *Attorney, Agent, or Firm* — BAYRAMOGLU LAW OFFICES, LLC

(57) ABSTRACT

An integrated device and method for treating toxic and refractory wastewater are provided. The integrated device includes an adjusting pool, a first-stage reactor, a second-stage reactor, a third-stage reactor, a coagulation sedimentation pool, and a biochemical reaction pool that are sequentially connected in series, and further includes an aeration blower. Each of the first-stage reactor and the third-stage reactor is an advanced oxidation reactor, and the second-stage reactor is a Fenton reactor. The coagulation sedimentation pool includes 2 to 4 stages, and each stage of the coagulation sedimentation pool includes a coagulation tank, a primary sedimentation tank, and a secondary sedimentation tank that are connected in series. The biochemical reaction pool includes an anoxic tank, an aerobic tank, a settling tank, and a clean water tank that are connected in (Continued)

series. The wastewater treatment method combines the integrated device for treating toxic and refractory wastewater with reasonable process parameters.

14 Claims, 5 Drawing Sheets

(51) Int. Cl.
| | |
|---|---|
| *C02F 1/52* | (2023.01) |
| *C02F 1/66* | (2023.01) |
| *C02F 1/72* | (2023.01) |
| *C02F 3/30* | (2023.01) |
| *C02F 1/28* | (2023.01) |
| *C02F 1/56* | (2023.01) |
| *C02F 1/74* | (2023.01) |
| *C02F 11/122* | (2019.01) |
| *C02F 1/00* | (2023.01) |
| *C02F 101/30* | (2006.01) |
| *C02F 103/34* | (2006.01) |
| *C02F 103/36* | (2006.01) |

(52) U.S. Cl.
CPC ............... *C02F 1/722* (2013.01); *C02F 3/30* (2013.01); *C02F 1/281* (2013.01); *C02F 1/5236* (2013.01); *C02F 1/56* (2013.01); *C02F 1/74* (2013.01); *C02F 11/122* (2013.01); *C02F 2001/007* (2013.01); *C02F 2101/306* (2013.01); *C02F 2101/308* (2013.01); *C02F 2103/343* (2013.01); *C02F 2103/36* (2013.01); *C02F 2201/002* (2013.01); *C02F 2209/42* (2013.01); *C02F 2209/44* (2013.01); *C02F 2301/026* (2013.01); *C02F 2301/046* (2013.01); *C02F 2301/08* (2013.01); *C02F 2305/026* (2013.01)

(56) References Cited

FOREIGN PATENT DOCUMENTS

| | | | | |
|---|---|---|---|---|
| CN | 104876319 A | | 9/2015 | |
| CN | 107792996 A | * | 3/2018 | |
| CN | 109607985 A | * | 4/2019 | ............... C02F 9/00 |
| CN | 208684505 U | | 4/2019 | |
| CN | 210127117 U | | 3/2020 | |
| CN | 112010493 A | * | 12/2020 | ............ C02F 11/122 |

OTHER PUBLICATIONS

Machine translation of CN # 112010493A, 2020, pp. 1-3. (Year: 2020).*
Machine translation of CN # 107792996A, 2018, pp. 1-28. (Year: 2018).*
Hengkui Hu, Water Pollution Control Technology, 2009, pp. 309-310, ISBN:978-7-5629-3018-1, Wuhan University of Technology Press.
Department of Water Supply and Drainage, Department of Plumbing, Tongji University, Basic knowledge of water supply engineering, 1979, pp. 163-170, 15040, China Building Industry Press, Abstract only Jun. 6, 2023.

* cited by examiner

A-partially enlarged view

INTEGRATED DEVICE AND METHOD FOR TREATING TOXIC AND REFRACTORY WASTEWATER

CROSS REFERENCE TO THE RELATED APPLICATIONS

This application is the national phase entry of International Application No. PCT/CN2021/071970, filed on Jan. 15, 2021, which is based upon and claims priority to Chinese Patent Application No. 202010821497.9, filed on Aug. 15, 2020, the entire contents of which are incorporated herein by reference.

TECHNICAL FIELD

The present disclosure belongs to the field of toxic and refractory wastewater treatment and relates to a device and method for treating toxic and refractory wastewater.

BACKGROUND

At present, toxic and refractory wastewater is subjected to physical and chemical pretreatments mainly through Fenton and Fenton-like reactions. In the Fenton reaction, under a catalytic action of $Fe^{2+}$, hydroxyl radicals (HO˙) with strong oxidizability are produced from $H_2O_2$. In the Fenton-like reaction, $O_2$ is reduced into $H_2O_2$ by zero-valent iron, an iron-based polymetallic material, or the like, and then under the catalysis of $Fe^{2+}$, HO˙ with strong oxidizability is produced in situ. HO˙ generated in the Fenton and Fenton-like reactions can quickly mineralize toxic and refractory pollutants in wastewater without selectivity or decompose toxic and refractory pollutants into small-molecule substances that can easily undergo a biochemical treatment, thereby improving the biodegradability of the wastewater.

The prior Fenton-like reactors are mainly fixed-bed reactors, and fixed-bed Fenton-like reactors have problems such as easy packing compaction and passivation and low mass-transfer efficiency. To solve the problems of packing compaction and low catalyst utilization efficiency, Chinese patent CN101979330B discloses a drum-type micro-electrolysis reactor and Chinese patent CN102276018B discloses an immersion iron-carbon micro-electrolysis reactor, where the entire reactor or packing drum is rotated to allow packing to be in a tumbling motion state, thereby preventing the packing from compaction and passivation. However, the use of such devices still has the following disadvantages: (1) The rotation of a reactor or packing drum requires high energy consumption, resulting in a high operating cost. (2) Although the rotation can flip a packing, the rotation cannot allow the packing to be in a fully-fluidized state in the entire reactor, and the mass-transfer efficiency is limited, which is not conducive to the improvement of wastewater treatment efficiency.

Chinese patent CN104876319A discloses a Fenton-like reactor. The packing in a reaction tank is fluidized through mechanical stirring and wastewater return to prevent the packing from compaction and passivation. However, the Fenton-like reactor depends on stirring to assist the fluidization of a packing, which is not conducive to the reduction of energy consumption. In addition, the Fenton-like reactor still cannot completely avoid the siltation of packing at the bottom center of the reaction tank, which is not conducive to the further improvement of mass-transfer efficiency in the reaction tank. Based on the Fenton-like reactor, Chinese patent CN104876319A discloses a method for treating toxic and refractory wastewater, and the method adopts the combination of two sets of Fenton-like reactors, a set of Fenton reactors, and a coagulation sedimentation pool, where each set of Fenton-like reactors includes 2 to 3 Fenton-like reactors and the coagulation sedimentation pool includes 2 to 4 stages. When the method is used for wastewater treatment, at least 5 reaction tanks connected in series and 2 stages of sedimentation pools are required, which results in high equipment cost and large floor space. Moreover, when the method is used for wastewater treatment, ozone is introduced into the Fenton reactor, and a tank body of the Fenton reactor is filled with activated carbon at a specified height. On the one hand, ozone treatment has a high cost, and an ozone removal device is required for the ozone treatment to prevent residual ozone from escaping the Fenton reaction to cause environmental destruction, which further increases the cost of wastewater treatment. On the other hand, the activated carbon filled in the reaction tank will affect the mass-transfer efficiency of pollutants, corrosion products, active substances, degradation products, or the like between a liquid phase and a packing, which reduces the wastewater treatment efficiency. Additionally, the Fenton-like reactor depends on a combined action of mechanical stirring and wastewater return to achieve the fluidization of a packing, which requires excessive energy consumption and thus is not conducive to the reduction of a wastewater treatment cost. The Fenton-like reactor cannot completely avoid the siltation of a packing at the bottom of the reaction tank, which hinders the further improvement of a packing fluidization degree and also limits the further improvement of wastewater treatment efficiency.

SUMMARY

An objective of the present disclosure is to overcome the shortcomings of the prior art and provide an integrated device and method for treating toxic and refractory wastewater, which can further reduce the treatment cost of toxic and refractory wastewater, improve the treatment efficiency of toxic and refractory wastewater, and enhance the treatment effect of toxic and refractory wastewater.

To achieve the above objective of the present disclosure, the present disclosure adopts the following technical solutions:

An integrated device for treating toxic and refractory wastewater is provided, including an adjusting pool, a first-stage reactor, a second-stage reactor, a third-stage reactor, a coagulation sedimentation pool, and a biochemical reaction pool that are sequentially connected in series, and further including an aeration blower.

Each of the first-stage reactor and the third-stage reactor is an advanced oxidation reactor, and the second-stage reactor is a Fenton reactor. The coagulation sedimentation pool includes 2 to 4 stages. Each stage of the coagulation sedimentation pool includes a coagulation tank, a primary sedimentation tank, and a secondary sedimentation tank that are connected in series, and each of the primary sedimentation tank and the secondary sedimentation tank is a vertical pipe sedimentation tank. The biochemical reaction pool includes an anoxic tank, an aerobic tank, a settling tank, and a clean water tank that are connected in series.

The adjusting pool communicates with a water inlet of the first-stage reactor through a pipe fitting, a water outlet of the first-stage reactor communicates with a water inlet of the second-stage reactor through a pipe fitting, a water outlet of the second-stage reactor communicates with a water inlet of the third-stage reactor through a pipe fitting, a water outlet of the third-stage reactor communicates with a water inlet of the coagulation sedimentation pool through a pipe fitting, and a water outlet of the coagulation sedimentation pool communicates with a water inlet of the biochemical reaction pool through a pipe fitting. The aeration blower communicates with an aeration member provided in each of the first-stage reactor, the third-stage reactor, the coagulation tank of each stage of the coagulation sedimentation pool, and the aerobic tank of the biochemical reaction pool through a pipe fitting.

A flow is pushed through the first-stage reactor, the second-stage reactor, the third-stage reactor, the coagulation sedimentation pool, and the biochemical reaction pool based on liquid level differences among the first-stage reactor, the second-stage reactor, the third-stage reactor, the coagulation sedimentation pool, and the biochemical reaction pool.

In the technical solution of the integrated device for treating toxic and refractory wastewater, the biochemical reaction pool further includes a mixed liquid return pump and a sludge return pump. The aerobic tank of the biochemical reaction pool communicates with the anoxic tank of the biochemical reaction pool through a mixed liquid return pipe via the mixed liquid return pump. The settling tank of the biochemical reaction pool communicates with the anoxic tank of the biochemical reaction pool through a sludge return pipe via the sludge return pump.

In the technical solution of the integrated device for treating toxic and refractory wastewater, a sludge filter press is further included, where the sludge filter press communicates with each stage of the coagulation sedimentation pool and the settling tank of the biochemical reaction pool through pipe fittings, and the sludge filter press is configured to conduct press filtration on sludge produced in each stage of the coagulation sedimentation pool and excess sludge produced on the basis of meeting sludge return requirements in the settling tank of the biochemical reaction pool for dewatering.

In the technical solution of the integrated device for treating toxic and refractory wastewater, each of the primary sedimentation tank and the secondary sedimentation tank of the coagulation sedimentation pool is a vertical pipe sedimentation tank, and the vertical pipe sedimentation tank is provided with a honeycomb vertical flow pipe. The design of the coagulation sedimentation pool can economically and effectively remove $Fe^{2+}$ and $Fe^{3+}$ from an effluent obtained after Fenton and Fenton-like treatments, which is conducive to the subsequent biochemical reaction treatment and also helps to improve the impact resistance of the wastewater treatment device during wastewater treatment.

In the technical solution of the integrated device for treating toxic and refractory wastewater, the advanced oxidation reactor includes a reaction tank and a sedimentation tank, where the reaction tank is provided with a wastewater return structure for allowing a micro-scale micro-electrolysis material (MEM) in the reaction tank to be in a fluidized state. An aeration structure is provided in the reaction tank, and the sedimentation tank is provided with a vertical flow pipe for accelerating the sedimentation of the micro-scale MEM. The Fenton reactor includes a reaction tank, where the reaction tank is provided with a wastewater return structure for allowing wastewater in the reaction tank to be in a swirling state.

In the technical solution of the integrated device for treating toxic and refractory wastewater, a structure of the advanced oxidation reactor can be designed with reference to the reactor disclosed in CN210127117U. It has been discovered that, when the reactor disclosed in CN210127117U is used for wastewater treatment, an inclined plate in the sedimentation tank cannot effectively avoid the discharge of packing during the discharge of the effluent from the sedimentation tank, and due to wastewater return, the conical baffle is easily damaged by the impact of water flow and the wear of the packing. In the present disclosure, the reactor disclosed in CN210127117U is subjected to a structural improvement, where in order to improve the sedimentation effect of the sedimentation tank of a packing, an inclination angle of the bottom of the sedimentation tank is improved, a honeycomb vertical flow pipe is provided in the sedimentation tank, a conical baffle is removably arranged at the bottom of the reaction tank to facilitate the replacement, and an aeration disc and an aeration pipe connected to the aeration disc are provided on the conical baffle to meet the requirements of aeration. Specifically, the structure of the improved advanced oxidation reactor of the present disclosure is as follows:

The advanced oxidation reactor includes a first reaction tank, a first return pump, a first return pipe, a first bracket, a first conical baffle, an aeration disc, and a sedimentation tank provided with a vertical flow pipe.

The first reaction tank includes a first cylinder and a first ball crown. The height of the first ball crown is less than the radius of the first cylinder, and the inner diameter of the first cylinder is equal to the inner diameter of the open end of the first ball crown. The end of the first cylinder is connected to the open end of the first ball crown, and the lower flange is provided at the bottom of the first ball crown. The first conical baffle is located inside the first reaction tank. The bottom of the first conical baffle is open, and the vertex of the first conical baffle faces upward. The periphery of the bottom of the first conical baffle is provided with an upper flange, and the open end of the first conical baffle is connected to the lower flange by the upper flange through a screw. The axis of the first conical baffle and the axis of the first cylinder coincide with the height of the first ball crown. The cone angle of the first conical baffle is 40° to 100°, and the ratio of the height of the first conical baffle to the height of the reaction tank is 1:(6-15).

The first cylinder is provided with a first agent-feeding port, a first water inlet, a first overflow port, a first returned water outlet, and a first water outlet. The first ball crown is provided with a first returned water inlet and a first evacuation port. The first evacuation port is located on the first ball crown outside the first conical baffle and the first returned water inlet is located at the center of the top of the first ball crown. At least three first 90° elbows are horizontally provided on the first conical baffle at the same height level so that the inside of the first conical baffle communicates with the outside of the first conical baffle. One end face of each of the at least three first 90° elbows on an outer wall of the first conical baffle (close to the bottom of the conical baffle) is located at the same side of a perpendicular line passing through the center of the other end face of the first 90° elbow. The top of the first conical baffle is provided with an aeration disc, and an aeration pipe is connected to the aeration disc.

The sedimentation tank is arranged on the outer side wall of the first cylinder, and the part of the outer side wall of the first cylinder also serves as the inner side wall of the sedimentation tank. The upper end of the sedimentation tank is open, the sedimentation tank has an inclined sedimentation tank bottom, and the sedimentation tank bottom is at an included angle of 15° to 60° with a vertical plane. The first water outlet is located at a junction between the sedimentation tank bottom and a side wall of the first cylinder so that the first reaction tank communicates with the sedimentation tank. The width of the first water outlet is equal to the length of the intersecting line between the sedimentation tank bottom and the outer wall of the first cylinder. The open height of the first water outlet is 10 mm to 200 mm, and the first water outlet is located at the lower part of the first cylinder. The upper part of the sedimentation tank is provided with a second water outlet. A vertical flow pipe is provided in the sedimentation tank. The vertical flow pipe is flush up and down. The bottom of the vertical flow pipe is located above the sedimentation tank bottom, and the top of the vertical flow pipe is located below the second water outlet.

The first return pipe has one end connected to the first returned water outlet and the other end connected to the first returned water inlet. The first return pump is located on the first return pipe, and the first bracket is connected to the outer wall of the first reaction tank so that the first reaction tank is perpendicular to a horizontal plane.

In the technical solution of the above-described advanced oxidation reactor, the first 90° elbows may also be arranged in the following manner: At least three first 90° elbows are evenly and horizontally arranged on the first ball crown at the same height level so that the inside of the first ball crown communicates with the outside of the first ball crown. An end face of each of the first 90° elbows located at the outer wall of the first conical baffle abuts the outer wall of the first conical baffle. The first return pipe has one end connected to the first returned water outlet and the other end connected to each of the first 90° elbows on the first ball crown through a branch pipe. The first return pump is located on the first return pipe. When the first 90° elbows are arranged in this way, it is not necessary to removably arrange the first conical baffle on the ball crown.

In the technical solution of the above-described advanced oxidation reactor, the vertical flow pipe is arranged in the sedimentation tank through a support frame horizontally arranged at the upper end of the sedimentation tank bottom and has a nominal diameter of 10 nm to 50 mm. The vertical flow pipe is preferably a honeycomb vertical flow pipe. The aeration disc is horizontally arranged at the top of the first conical baffle.

In the technical solution of the integrated device for treating toxic and refractory wastewater, the structure of the Fenton reactor can be designed by referring to the reactor disclosed in CN208684505U. It has been discovered that, when the reactor disclosed in CN208684505U is used for wastewater treatment, due to wastewater return, the conical baffle is easily damaged by the impact of water flow. In the present disclosure, based on the reactor disclosed in CN208684505U, a structure for introducing circulating water into a reaction tank is improved to prevent the introduced circulating water from impacting the conical baffle, which prolongs the service life of the conical baffle. Specifically, the structure of the improved Fenton reactor of the present disclosure is as follows:

The Fenton reactor includes a second reaction tank, a second return pump, a second return pipe, a second bracket, and a second conical baffle.

The second reaction tank includes a second cylinder and a second ball crown. The height of the second ball crown is less than the radius of the second cylinder, and the inner diameter of the second cylinder is equal to the inner diameter of the open end of the second ball crown. An end of the second cylinder is connected to the open end of the second ball crown. The second conical baffle is located inside the second reaction tank. The bottom of the second conical baffle is open, and the vertex of the second conical baffle faces upward. The open end of the second conical baffle is connected to the inner wall of the second ball crown. The axis of the second conical baffle and the axis of the second cylinder coincide with the height of the second ball crown. The cone angle of the second conical baffle is 40° to 100°, and the ratio of the height of the second conical baffle to the height of the second reaction tank is 1:(6-15).

The second cylinder is provided with a second agent-feeding port, a second water inlet, a second overflow port, a second returned water outlet, and a third water outlet. The second ball crown is provided with a second evacuation port, and the second evacuation port is located on the second ball crown outside the second conical baffle. At least three second 90° elbows are evenly and horizontally provided on the second ball crown at the same height level so that the inside of the second ball crown communicates with the outside of the second ball crown. An end face of each of the second 90° elbows located at the outer wall of the second conical baffle abuts the outer wall of the second conical baffle.

The second return pipe has one end connected to the second returned water outlet and the other end connected to each of the second 90° elbows on the second ball crown through a branch pipe. The second return pump is located on the second return pipe. The second bracket is connected to the outer wall of the second reaction tank so that the second reaction tank is perpendicular to a horizontal plane.

The present disclosure also provides a method for treating toxic and refractory wastewater, where the method adopts the integrated device for treating toxic and refractory wastewater and includes the following steps:

(1) adjusting the pH of the wastewater in the adjusting pool to 1 to 4, continuously pumping the wastewater in the adjusting pool into the first-stage reactor, adding a micro-scale MEM to the first-stage reactor, aerating, and allowing the micro-scale MEM in the first-stage reactor to be in a fluidized state through wastewater return to conduct a wastewater treatment, where a hydraulic retention time (HRT) of the wastewater in the first-stage reactor is controlled at 20 min to 180 min;

(2) allowing wastewater treated by the first-stage reactor to continuously enter the second-stage reactor, adding sulfuric acid and hydrogen peroxide to the second-stage reactor, adjusting the concentration of hydrogen peroxide in the second-stage reactor to 20 mmol/L to 200 mmol/L, adjusting a pH of the wastewater to 2 to 4, and allowing the wastewater in the second-stage reactor to be in a swirling state through wastewater return to conduct a wastewater treatment, where an HRT of the wastewater in the second-stage reactor is controlled at 20 min to 180 min;

(3) allowing wastewater treated by the second-stage reactor to continuously enter the third-stage reactor, adding the micro-scale MEM to the third-stage reactor, aerating, and allowing the micro-scale MEM in the third-stage reactor to be in the fluidized state through wastewater return to conduct a wastewater treatment, where an HRT of the wastewater in the third-stage reactor is controlled at 20 min to 180 min;

(4) allowing wastewater treated by the third-stage reactor to continuously enter the coagulation sedimentation pool for a coagulation sedimentation treatment by:

allowing the wastewater treated by the third-stage reactor to continuously enter a coagulation tank of a first-stage coagulation sedimentation pool, adding a flocculating agent and an inorganic alkali to the coagulation tank, aerating, allowing a mixed liquid generated in the coagulation tank to continuously enter a primary sedimentation tank, and allowing wastewater treated by the primary sedimentation tank to continuously enter a secondary sedimentation tank;

allowing wastewater treated by the secondary sedimentation tank of the first-stage coagulation sedimentation pool to enter a coagulation tank of a second-stage coagulation sedimentation pool, and repeating the above operations of adding the flocculating agent and the inorganic alkali, aerating, and allowing wastewater to enter a primary sedimentation tank and a secondary sedimentation tank until wastewater enters a secondary sedimentation tank of the last-stage coagulation sedimentation pool, where an HRT of the wastewater in the coagulation sedimentation pool is controlled at 20 min to 360 min; and (5) allowing wastewater treated by the coagulation sedimentation pool to continuously enter the anoxic tank of the biochemical reaction pool; allowing wastewater treated by the anoxic tank to continuously enter the aerobic tank, and aerating the aerobic tank to conduct a treatment; allowing wastewater treated by the aerobic tank to continuously enter the settling tank; and allowing wastewater treated by the settling tank to continuously enter the clean water tank, and discharging an effluent meeting emission standards, where a biological packing is fixed in each of the anoxic tank and the aerobic tank, an HRT of the wastewater in the anoxic tank is controlled at 60 min to 600 min, and an HRT of the wastewater in the aerobic tank is controlled at 180 min to 1200 min.

In the technical solution of the method for treating toxic and refractory wastewater, in step (5), the mixed liquid in the aerobic tank of the biochemical reaction pool is returned to the anoxic tank of the biochemical reaction pool, and sludge in the settling tank of the biochemical reaction pool is returned to the anoxic tank of the biochemical reaction pool, where a sludge return ratio is 50% to 100% and a mixed liquid return ratio is 100% to 400%.

In the technical solution of the method for treating toxic and refractory wastewater, in step (5), for the wastewater in the anoxic tank, a dissolved oxygen (DO) concentration is controlled at mg/L to 0.5 mg/L and a pH is controlled at 6.5 to 7.5, and for the wastewater in the aerobic tank, a DO concentration is controlled at 2 mg/L to 4 mg/L and a pH is controlled at 7 to 8.

In the technical solution of the method for treating toxic and refractory wastewater, the micro-scale MEM is a zero-valent iron particle, an iron-copper bimetallic particle, an iron-palladium bimetallic particle, or an iron-nickel bimetallic particle. The amount of the micro-scale MEM added to the first-stage or third-stage reactor is determined according to specific water quality conditions. Usually, the micro-scale MEM is added to the first-stage or third-stage reactor at an amount of 10 g to 200 g per liter of an effective volume of the first-stage or third-stage reactor.

In the technical solution of the method for treating toxic and refractory wastewater, in step (4), the types and amounts of the flocculating agent and inorganic alkali are determined according to actual demands and water quality conditions. Usually, the pH in the coagulation tank in each stage of the coagulation sedimentation pool is controlled at 7.5 to 10. The inorganic alkali added to the coagulation tank in the coagulation sedimentation pool is mainly sodium hydroxide. The flocculating agent added to the coagulation tank is mainly selected from the group consisting of polyacrylamide (PAM), polyaluminum chloride (PAC), polyferric sulfate (PFS), polyaluminum sulfate (PAS), and polyferric chloride (PFC), and the flocculating agents can be used alone or in combination.

In the technical solution of the method for treating toxic and refractory wastewater, in steps (1) and (3), when the liquid level of wastewater in the first-stage/third-stage reactor enables wastewater return, that is, when the liquid level of wastewater is higher than a returned water outlet of the reaction tank of the first-stage/third-stage reactor, the micro-scale MEM is added to the first-stage/third-stage reactor. In step (2), when the liquid level of wastewater in the second-stage reactor enables wastewater return, that is, when the liquid level of wastewater is higher than a returned water outlet of the reaction tank of the second-stage reactor, sulfuric acid and hydrogen peroxide are added to the second-stage reactor.

In the technical solution of the method for treating toxic and refractory wastewater, to increase the automation degree of wastewater treatment, sulfuric acid and hydrogen peroxide are added to the second-stage reactor through an agent-feeding pump in step (2), where each of the sulfuric acid and hydrogen peroxide is diluted to a specified concentration and then pumped by the agent-feeding pump into the second-stage reactor. The flocculating agent and inorganic alkali are added to the coagulation tank through an agent-feeding pump in step (4), where each of the flocculating agent and inorganic alkali is prepared into a solution and then pumped by the agent-feeding pump into the coagulation tank.

In the technical solution of the method for treating toxic and refractory wastewater, sludge produced in each stage of the coagulation sedimentation pool and excess sludge produced on the basis of meeting sludge return requirements in the settling tank of the biochemical reaction pool are collectively subjected to press filtration by the sludge filter press for dewatering (the dewatered sludge is generally hazardous waste and cannot be landfilled), and wastewater produced by the press filtration of the sludge filter press can be returned to the coagulation sedimentation pool or the biochemical reaction pool for second-time treatment.

Compared with the prior art, the technical solutions provided by the present disclosure have the following beneficial technical effects:

1. The present disclosure provides an integrated device for toxic and refractory wastewater, including an adjusting pool, a first-stage reactor, a second-stage reactor, a third-stage reactor, a coagulation sedimentation pool of 2 to 4 stages, and a biochemical reaction pool. The adjusting pool can effectively alleviate the adverse effects of fluctuations in wastewater quality conditions on the wastewater treatment effect and is conducive to improving the impact resistance of the device. The three stages of reactors rely only on wastewater return to achieve the full fluidization of a catalyst in the reactor and ensure a swirling state of wastewater; thus, an external stirring device is not required, which is conducive to reducing the energy consumption of wastewater treatment. Any one of the three stages of reactors does not include a packing that is fixed, which is conducive to improving the mass-transfer efficiency. The reactors effectively couple Fenton-like and Fenton reactions, which can further improve the treatment efficiency of wastewater and enhance the treatment effect of wastewater. The design of the coagulation sedimentation pool can effectively remove iron ions and other metal ions from an effluent obtained after the treatment by the three stages of reactors. The design of the biochemical reaction pool can ensure the thorough removal of pollutants in wastewater and make the effluent meet emission standards. Compared with the existing toxic and refractory wastewater treatment device that requires five stages of reactors connected in series and a coagulation sedimentation pool, the wastewater treatment device provided by the present disclosure has a simple structure, only requires three stages of reactors connected in series, a coagulation sedimentation pool, and a biochemical reaction pool to achieve the efficient treatment of toxic and refractory wastewater, and does not require the introduction of ozone for treatment, a supporting ozone generation and removal device, and a supporting stirring device, which can effectively reduce the device cost, energy consumption, and floor space. In addition, the wastewater treatment device provided by the present disclosure does not have a fixed catalyst, where catalysts in the first-stage and third-stage reactors are fully fluidized and the mass-transfer efficiency is high, which is conducive to improving the wastewater treatment efficiency.

2. In the integrated device for toxic and refractory wastewater provided by the present disclosure, a coagulation sedimentation pool of 2 to 4 stages is designed, and each stage of the coagulation sedimentation pool includes a coagulation tank, a primary sedimentation tank, and a secondary sedimentation tank that are connected in series. An inorganic alkali can be added to the coagulation tank to effectively remove iron ions and other metal ions from wastewater and reduce the chromaticity and chemical oxygen demand (COD) of wastewater. The addition of a flocculating agent to the coagulation tank and the design of the vertical pipe sedimentation tank of the coagulation sedimentation pool can accelerate the sedimentation of flocs to effectively remove iron ions and other metal ions from an effluent obtained after the treatment by the three stages of reactors, which is conducive to the subsequent biochemical reaction treatment. The design of the coagulation sedimentation pool is also conducive to improving the impact resistance of the device.

3. The biochemical reaction pool in the integrated device for treating toxic and refractory wastewater provided by the present disclosure includes an anoxic tank, an aerobic tank, a settling tank, and a clean water tank. A biological packing is fixed in each of the anoxic tank and the aerobic tank. In addition, sludge and mixed liquid return structures are designed to return a mixed liquid in the aerobic tank to the anoxic tank and return sludge in the settling tank to the anoxic tank. The design of the biochemical reaction pool has the characteristics of impact load resistance, low sludge yield, high biomass, and long sludge age, and can maintain abundant nitrifying and denitrifying bacteria to improve a nitrogen removal effect, which is conducive to the full degradation of pollutants in wastewater, such that an effluent obtained after treatment can stably meet relevant emission standards.

4. The present disclosure also provides a method for treating toxic and refractory wastewater. When the method for treating toxic and refractory wastewater is used for wastewater treatment, $Fe^{2+}$ in an effluent from the first-stage reactor can be directly used as a catalyst for a Fenton reaction in the second-stage reactor, and thus there is no need to add a catalyst to the second-stage reactor. The third-stage reactor can consume the residual hydrogen peroxide and the acid produced in an effluent from the second-stage reactor, and the hydrogen peroxide and acid in the effluent from the second-stage reactor can also enhance an advanced oxidation reaction in the third-stage reactor. Since the three stages of reactors couple Fenton-like and Fenton reactions that are strongly synergistic with each other, the method in the present disclosure, when used for wastewater treatment, can not only avoid the adverse effects of hydrogen peroxide and acid residues on the subsequent biochemical treatment but also reduce the waste of hydrogen peroxide. After the third-stage reactor consumes the acid in the effluent from the second-stage reactor, the pH of the effluent from the third-stage reactor increases, which can reduce the amount of an alkali added during the subsequent coagulation sedimentation and reduce the wastewater treatment cost while enhancing the wastewater treatment effect. The method for treating toxic and refractory wastewater provided by the present disclosure is a complete wastewater treatment method, where the wastewater is subjected to Fenton and Fenton-like reactions in the first-stage to third-stage reactors, then subjected to a coagulation sedimentation treatment to effectively remove iron ions and other metal ions from the wastewater, and then subjected to a biochemical treatment to completely remove pollutants from the wastewater, such that an effluent meets emission standards. The method has a short process flow and high mass-transfer efficiency from the first-stage to third-stage reactors, which is conducive to reducing the wastewater treatment cost, improving the wastewater treatment efficiency, and improving the wastewater treatment effect.

5. The method for treating toxic and refractory wastewater provided by the present disclosure combines the integrated device for treating toxic and refractory wastewater provided by the present disclosure with reasonable process parameters, effectively couples Fenton-like and Fenton reactions that are synergistic with each other, and adopts appropriate coagulation sedimentation and biochemical reactions, which can further enhance the wastewater treatment effect and improve the wastewater treatment efficiency in contrast to the prior art. Experimental results show that the wastewater treatment method provided by the present disclosure exhibits a prominent effect when used for treating wastewater generated in detonator production, military primer production, nickel hydrazine nitrate (NHN) initiating explosive production, antibiotic production, dye intermediate production, pharmaceutical production, and pesticide production, which can greatly improve the biodegradability of toxic and refractory wastewater and has a wide application range.

BRIEF DESCRIPTION OF THE DRAWINGS

FIG. 1A is a front view, FIG. 1B is a top view, and FIG. 1C is a partially enlarged view at A in FIG. 1A;

FIG. 2A is a front view and FIG. 2B is a top view;

FIG. 3A is a front view and FIG. 3B is a top view.

In the figures, 10: adjusting pool; 20: first-stage reactor; 30: second-stage reactor; 40: third-stage reactor; 50: coagulation sedimentation pool; 501: coagulation tank; 502: primary sedimentation tank; 503: secondary sedimentation tank; 60: biochemical reaction pool; 601: anoxic tank; 602: aerobic tank; 603: settling tank; 604: clean water tank; 605: mixed liquid return pump; 606: sludge return pump; 70: aeration blower; 80: sludge filter press; 1-1: first reaction tank; 1-2: first return pump; 1-3: first return pipe; 1-4: first bracket; 1-5: first conical baffle; 1-6: aeration disc; 1-7: sedimentation tank; 1-8: first cylinder; 1-9: first ball crown; 1-10: lower flange; 1-11: upper flange; 1-12: screw; 1-13:

gasket; 1-14: first agent-feeding port; 1-15: first water inlet; 1-16: first overflow port; 1-17: first returned water outlet; 1-18: first water outlet; 1-19: first returned water inlet; 1-20: first evacuation port; 1-21: first 90° elbow; 1-22: sedimentation tank bottom; 1-23: second water outlet; 1-24: vertical flow pipe; 1-25: support frame; α: included angle between the sedimentation tank bottom and a vertical plane; 3-1: second reaction tank; 3-2: second return pump; 3-3: second return pipe; 3-4: second bracket; 3-5: second conical baffle; 3-6: second agent-feeding port; 3-7: second cylinder; 3-8: second ball crown; 3-9: second water inlet; 3-10: second overflow port; 3-11: second returned water outlet; 3-12: third water outlet; 3-13: second evacuation port; and 3-14: second 90° elbow.

DETAILED DESCRIPTION OF THE EMBODIMENTS

The integrated device and method for treating toxic and refractory wastewater provided by the present disclosure are further described below through examples. It should be noted that the following examples are only provided to further illustrate the present disclosure and should not be construed as a limitation to the protection scope of the present disclosure, and some non-essential improvements and adjustments made by those skilled in the art to the present disclosure according to the above inventive content should still fall within the protection scope of the present disclosure.

Example 1: Advanced Oxidation Reactor Structure

Figure 1A:
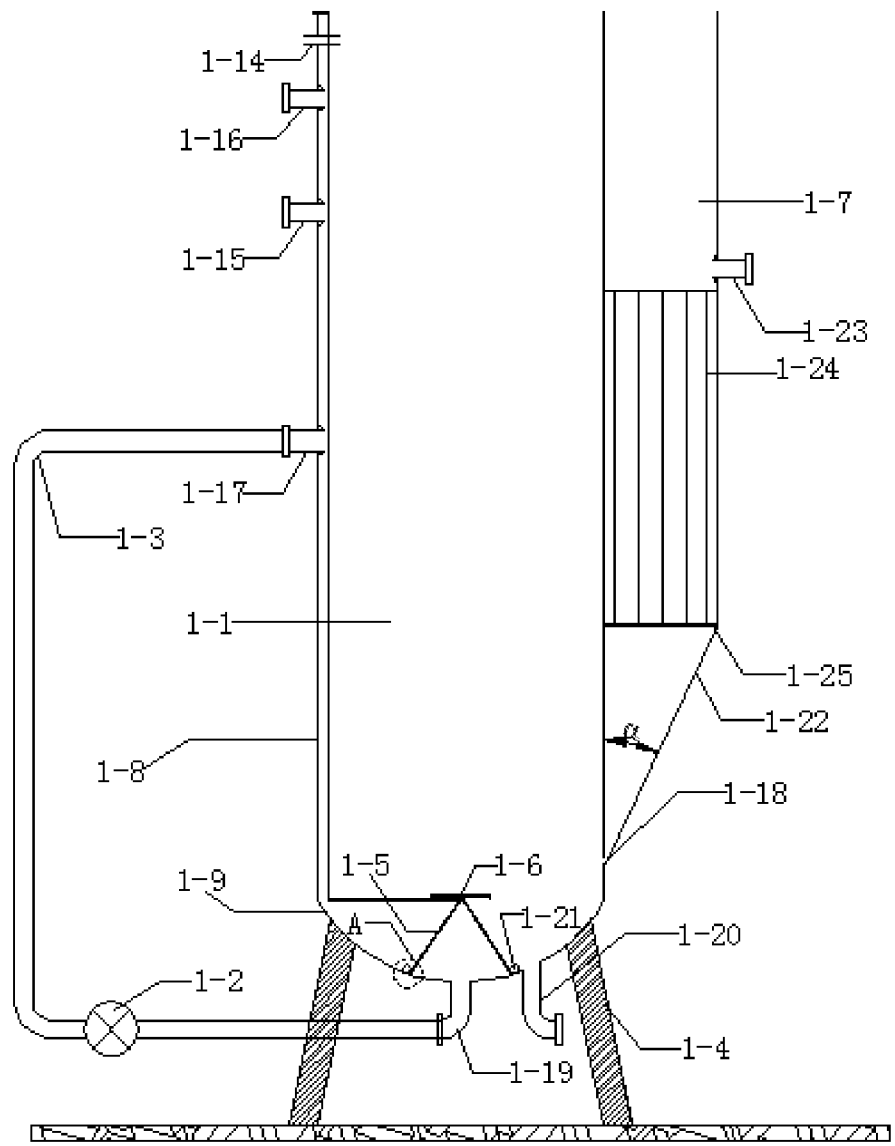
FIGS. 1A-1C show schematic structural diagrams of a first-stage or third-stage reactor (advanced oxidation reactor), where
Figure 1B:
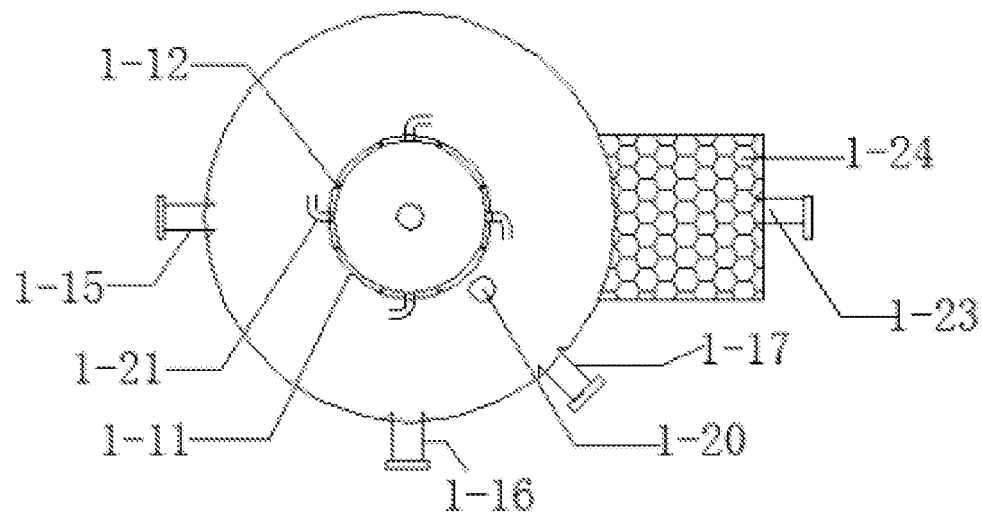
Figure 1C:
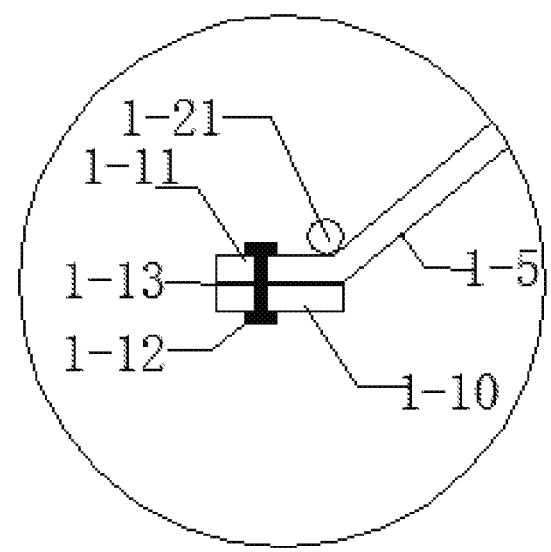

In this example, an advanced oxidation reactor is provided, including first reaction tank 1-1, first return pump 1-2, first return pipe 1-3, first bracket 1-4, first conical baffle 1-5, aeration disc 1-6, and sedimentation tank 1-7 provided with vertical flow pipe 1-24. Schematic structural diagrams of the advanced oxidation reactor are shown in FIGS. 1A-1C.

The first reaction tank 1-1 includes first cylinder 1-8 and first ball crown 1-9. The height of the first ball crown 1-9 is less than the radius of the first cylinder 1-8, and the inner diameter of the first cylinder 1-8 is equal to the inner diameter of an open end of the first ball crown 1-9. The end of the first cylinder 1-8 is connected to the open end of the first ball crown 1-9, and lower flange 1-10 is provided at the bottom of the first ball crown 1-9. The first conical baffle 1-5 is located inside the first reaction tank 1-1. The bottom of the first conical baffle 1-5 is open, and the vertex of the first conical baffle faces upward. The periphery of the bottom of the first conical baffle 1-5 is provided with an upper flange 1-11. The open end of the first conical baffle 1-5 is connected to the lower flange 1-10 by the upper flange 1-11 through screw 1-12, and gasket 1-13 is provided between the upper flange 1-11 and the lower flange 1-10, such that the first conical baffle 1-5 is removably fixed on the first ball crown 1-9 and the open end of the first conical baffle 1-5 is connected to an inner wall of the bottom of the first ball crown 1-9. The axis of the first conical baffle 1-5 and the axis of the first cylinder 1-8 coincide with the height of the first ball crown 1-9. The cone angle of the first conical baffle 1-5 is 40°, and the ratio of the height of the first conical baffle 1-5 to the height of the first reaction tank 1-1 is 1:12.

The first cylinder 1-9 is provided with first agent-feeding port 1-14, first water inlet 1-15, first overflow port 1-16, first returned water outlet 1-17, and first water outlet 1-18. The first ball crown 1-9 is provided with first returned water inlet 1-19 and first evacuation port 1-20. The first evacuation port 1-20 is located on the first ball crown 1-9 outside the first conical baffle 1-5, and the first returned water inlet 1-19 is located at the center of the top of the first ball crown 1-9. Four first 90° elbows 1-21 are evenly and horizontally provided on the first conical baffle 1-5 at the same height level so that the inside of the first conical baffle 1-5 communicates with the outside of the first conical baffle 1-5. One end face of each of the first 90° elbows 1-21 on an outer wall of the first conical baffle 1-5 is located at the same side of a perpendicular line passing through the center of the other end face of the first 90° elbow 1-21. An aeration disc 1-6 is horizontally provided at a top of the first conical baffle 1-5, and an aeration pipe is connected to the aeration disc 1-6.

The sedimentation tank 1-7 is arranged on the outer side wall of the first cylinder 1-8, and a part of the outer side wall of the first cylinder 1-8 also serves as the inner side wall of the sedimentation tank 1-7. The upper end of the sedimentation tank 1-7 is open. The sedimentation tank 1-7 has an inclined sedimentation tank bottom 1-22, and the sedimentation tank bottom 1-22 is at an included angle of 40° with a vertical plane. The first water outlet 1-18 is located at a junction between the sedimentation tank bottom 1-22 and a side wall of the first cylinder 1-8 so that the first reaction tank 1-1 communicates with the sedimentation tank 1-7. The width of the first water outlet 1-18 is equal to the length of the intersecting line between the sedimentation tank bottom 1-22 and the outer wall of the first cylinder 1-8. The open height of the first water outlet 1-18 is 80 mm, and the first water outlet 1-18 is located at a lower part of the first cylinder 1-8. The upper part of the sedimentation tank 1-7 is provided with second water outlet 1-23; vertical flow pipe 1-24 is provided in the sedimentation tank 1-7, and the vertical flow pipe 1-24 is arranged in the sedimentation tank 1-7 through support frame 1-25 horizontally arranged at an upper end of the sedimentation tank bottom 1-22. The vertical flow pipe 1-24 is flush up and down. The bottom of the vertical flow pipe 1-24 is located above the sedimentation tank bottom 1-22, and the top of the vertical flow pipe 1-24 is located below the second water outlet 1-23. The nominal diameter of the vertical flow pipe 1-24 is 20 mm, and the vertical flow pipe 1-24 is a honeycomb vertical flow pipe.

The first return pipe 1-3 has one end connected to the first returned water outlet 1-17 and the other end connected to the first returned water inlet 1-19. The first return pump 1-2 is located on the first return pipe 1-3. The first bracket 1-4 is connected to the outer wall of the first reaction tank 1-1 so that the first reaction tank 1-1 is perpendicular to a horizontal plane.

Example 2: Advanced Oxidation Reactor Structure

The advanced oxidation reactor structure in this example is basically the same as the advanced oxidation reactor structure in Example 1, except for the following differences: The cone angle of the first conical baffle 1-5 is 60°, and the ratio of the height of the first conical baffle 1-5 to the height of the first reaction tank 1-1 is 1:8. Three first 90° elbows 1-21 are evenly and horizontally provided on the first conical baffle 1-5 at the same height level. The sedimentation tank bottom 1-22 is at an included angle of 30° with the vertical plane. The open height of the first water outlet is 50 mm; the nominal diameter of the vertical flow pipe 1-24 is 10 mm.

Example 3: Advanced Oxidation Reactor Structure

Figure 2A:
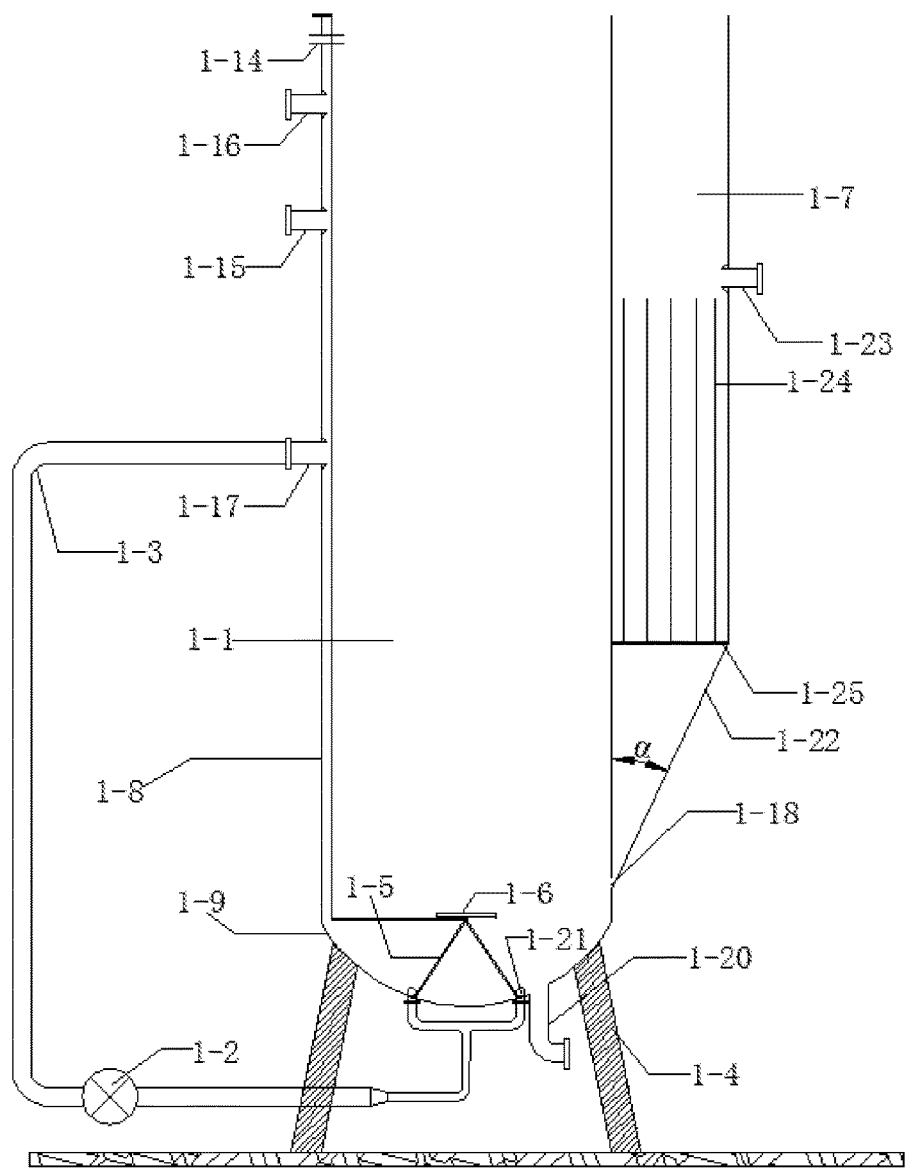
FIGS. 2A-2B show schematic structural diagrams of another first-stage or third-stage reactor (advanced oxidation reactor), where
Figure 2B:
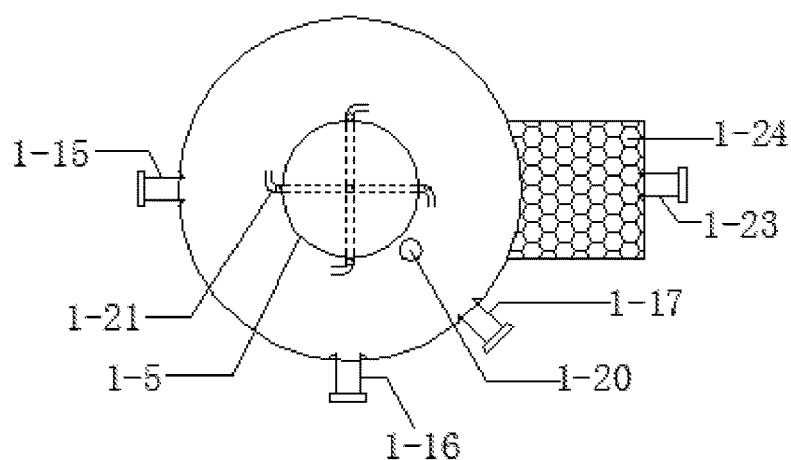

The advanced oxidation reactor structure in this example is shown in FIGS. 2A-2B and is basically the same as the advanced oxidation reactor structure in Example 1, except for the following differences: the first 90° elbows are arranged in another manner as follows: Four first elbows 1-21 are evenly and horizontally provided on the first ball crown 1-9 at the same height level so that the inside of the first ball crown 1-9 communicates with the outside of the first ball crown. The end face of each of the first 90° elbows 1-21 located at the outer wall of the first conical baffle 1-5 abuts the outer wall of the first conical baffle 1-5. The first return pipe 1-3 has one end connected to the first returned water outlet 1-17 and the other end connected to each of the first 90° elbows 1-21 on the first ball crown 1-9 through a branch pipe. The first conical baffle 1-5 is not removably connected but is directly fixed to the inner wall of the first ball crown 1-5. The cone angle of the first conical baffle 1-5 is 40°, and the ratio of the height of the first conical baffle 1-5 to the height of the first reaction tank 1-1 is 1:13. The sedimentation tank bottom 1-22 is at an included angle of 25° with the vertical plane. The open height of the first water outlet 1-18 is 100 mm; and the nominal diameter of the vertical flow pipe 1-24 is 20 mm.

Example 4: Advanced Oxidation Reactor Structure

The advanced oxidation reactor structure in this example is basically the same as the advanced oxidation reactor structure in Example 3, except for the following differences: Three first 90° elbows 1-21 are evenly and horizontally provided on the first ball crown 1-9 at the same height level. The cone angle of the first conical baffle 1-5 is 50°, and the ratio of the height of the first conical baffle 1-5 to the height of the first reaction tank 1-1 is 1:10. The sedimentation tank bottom 1-22 is at an included angle of 40° with the vertical plane. The open height of the first water outlet 1-18 is 50 mm; the nominal diameter of the vertical flow pipe 1-24 is 15 mm.

The structural designs of the first 90° elbows 1-21, the first ball crown 1-9, and the first conical baffle 1-5 in the advanced oxidation reactor are conducive to the swirling of wastewater under the action of the return pump and can prevent micro-scale MEM from accumulating in the center and around the bottom of the first reaction tank 1-1 and make the micro-scale MEM in a fully-fluidized state in the first reaction tank 1-1 to avoid the compaction of the micro-scale MEM, which can effectively improve the mass-transfer efficiency in the first reaction tank 1-1, strengthen the wastewater treatment effect, and extend the operation cycle of the reactor. Compared with the existing mechanical stirring, the fluidization of the micro-scale MEM in the reactor through a circulating water flow can lead to a better fluidization effect and significantly-lower energy consumption, which is conducive to reducing the wastewater treatment cost and improving the wastewater treatment efficiency. In Examples 1 and 2, the first conical baffle 1-5 in the first reaction tank 1-1 is designed to be removable, such that it is easy to replace the first conical baffle 1-5 when the first conical baffle fails to work normally due to wear, which can extend the service life of the entire reactor. In Examples 3 and 4, the end face of each of the first 90° elbows 1-21 located at the outer wall of the first conical baffle 1-5 abuts the outer wall of the first conical baffle 1-5, and the first return pipe 1-3 has one end connected to the first returned water outlet 1-17 and the other end connected to each of the first 90° elbows 1-21 on the first ball crown 1-9 through a branch pipe, which can prevent circulating water flow from impacting and damaging the first conical baffle 1-5, which is conducive to extending the service life of the entire reactor.

The design of the sedimentation tank 1-7 can make the micro-scale MEM in treated wastewater fully settle in the sedimentation tank 1-7, which avoids the loss of the micro-scale MEM with effluent and can also prevent the micro-scale MEM from entering the subsequent treatment procedure to adversely affect the subsequent treatment. The arrangement of the vertical flow pipe 1-24 in the sedimentation tank 1-7 can accelerate the sedimentation of a micro-scale MEM. The design of the aeration disc 1-6 can not only provide the DO required for wastewater treatment but also play a role in the fluidization of a micro-scale MEM to further increase the fluidization degree of the micro-scale MEM in wastewater, which improves the mass-transfer efficiency, enhances the wastewater treatment effect, and improves the wastewater treatment efficiency.

Example 5: Fenton Reactor Structure

Figure 3A:
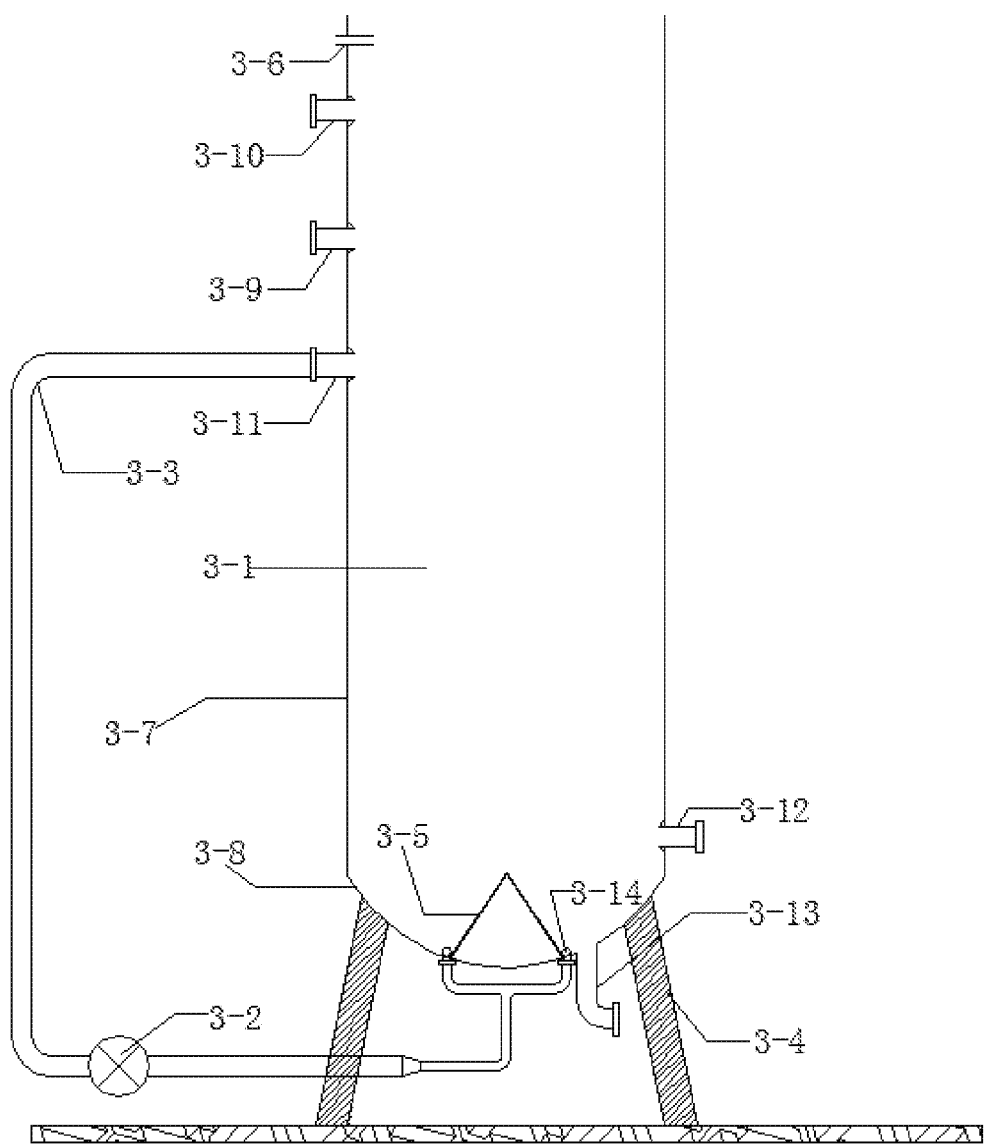
FIGS. 3A-3B show schematic structural diagrams of a second-stage reactor (Fenton reactor), where
Figure 3B:
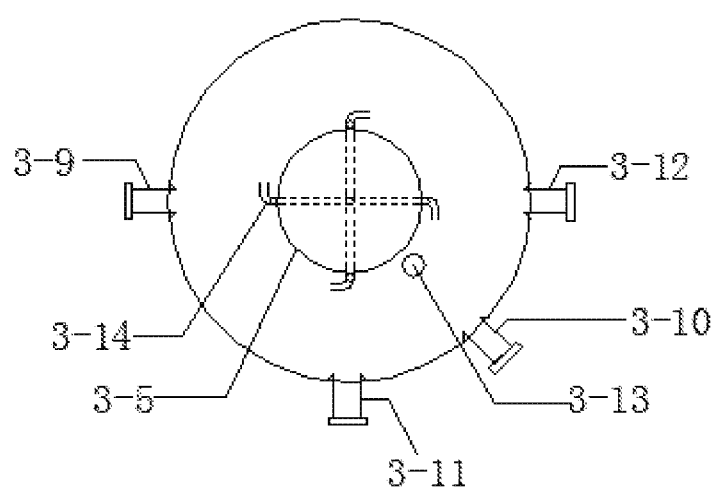

The Fenton reactor structure in this example is shown in FIGS. 3A-3B and includes second reaction tank 3-1, second return pump 3-2, second return pipe 3-3, second bracket 3-4, and second conical baffle 3-5.

The second reaction tank 3-1 includes second cylinder 3-7 and second ball crown 3-8. The height of the second ball crown 3-8 is less than the radius of the second cylinder 3-7, and the inner diameter of the second cylinder 3-7 is equal to the inner diameter of the open end of the second ball crown 3-8. The end of the second cylinder 3-7 is connected to the open end of the second ball crown 3-8. The second conical baffle 3-5 is located inside the second reaction tank 3-1. The bottom of the second conical baffle 3-5 is open, and the vertex of the second conical baffle faces upward. The open end of the second conical baffle 3-5 is connected to an inner wall of the second ball crown 3-8. The axis of the second conical baffle 3-5 and the axis of the second cylinder 3-7 coincide with the height of the second ball crown 3-8. The cone angle of the second conical baffle 3-5 is 50°, and the ratio of the height of the second conical baffle 3-5 to the height of the second reaction tank 3-1 is 1:12.

The second cylinder 3-7 is provided with second agent-feeding port 3-6, second water inlet 3-9, second overflow port 3-10, second returned water outlet 3-11, and third water outlet 3-12. The second ball crown 3-8 is provided with second evacuation port 3-13, and the second evacuation port 3-13 is located on the second ball crown 3-8 outside the second conical baffle 3-5. Four second 90° elbows 3-14 are evenly and horizontally provided on the second ball crown 3-8 at the same height level so that the inside of the second ball crown 3-8 communicates with the outside of the second ball crown 3-8. The end face of each of the second 90° elbows 3-14 located at the outer wall of the second conical baffle 3-5 abuts the outer wall of the second conical baffle 3-5.

The second return pipe 3-3 has one end connected to the second returned water outlet 3-11 and the other end connected to each of the second 90° elbows 3-14 on the second ball crown 3-8 through a branch pipe. The second return pump 3-2 is located on the second return pipe 3-3, and the second bracket 3-4 is connected to an outer wall of the second reaction tank 3-1 so that the second reaction tank 3-1 is perpendicular to a horizontal plane.

Example 6: Fenton Reactor Structure

The Fenton reactor structure in this example is basically the same as the Fenton reactor structure in Example 5, except that: The cone angle of the second conical baffle 3-5 is 60°; the ratio of the height of the second conical baffle 3-5 to the height of the second reaction tank 3-1 is 1:10. Three second 90° elbows 3-14 are evenly and horizontally provided on the second ball crown 3-8 at the same height level.

In the Fenton reactor, the arrangement positions of the second 90° elbows 3-14 and the structural designs of the second ball crown 3-8 and the second conical baffle 3-5 are conducive to the swirling of wastewater under the action of the return pump, which can effectively improve the mass-transfer efficiency in the reaction tank and strengthen the wastewater treatment effect.

Figure 4:
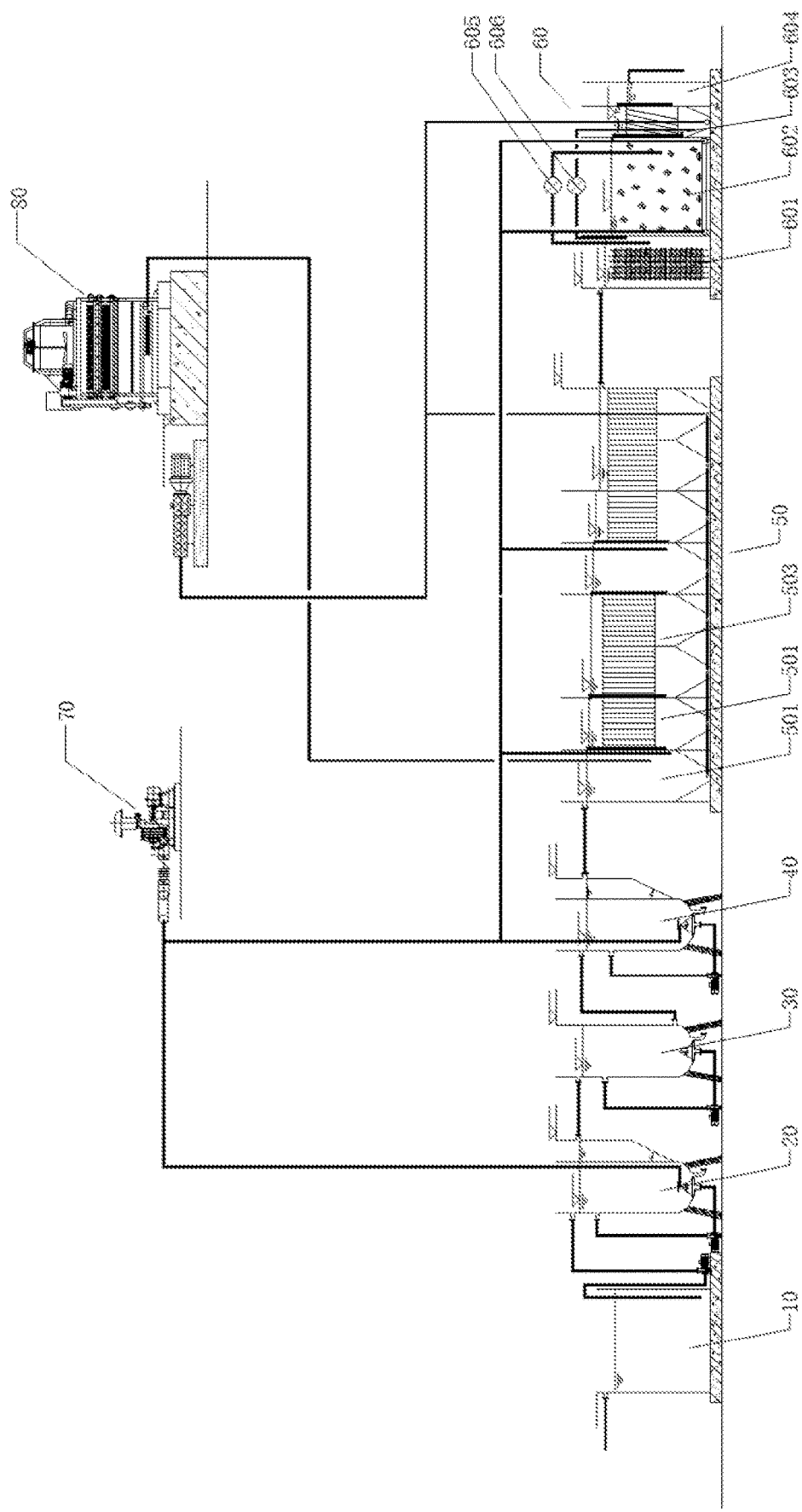
FIG. 4 shows a schematic structural diagram and a process flow diagram of the integrated device for treating toxic and refractory wastewater in the present disclosure.

Example 7: Structure of an Integrated Device for Treating Toxic and Refractory Wastewater A schematic structural diagram of the integrated device for treating toxic and refractory wastewater in this example is shown in FIG. 4, and the integrated device includes adjusting pool 10, first-stage reactor 20, second-stage reactor 30, third-stage reactor 40, coagulation sedimentation pool 50, and biochemical reaction pool 60 that are sequentially connected in series, and further includes an aeration blower 70 and sludge filter press 80.

Each of the first-stage reactor 20 and the third-stage reactor 40 is the advanced oxidation reactor in Example 1, and the second-stage reactor 30 is the Fenton reactor in Example 5. The coagulation sedimentation pool 50 includes 2 stages, and each stage of the coagulation sedimentation pool 50 includes coagulation tank 501, primary sedimentation tank 502, and secondary sedimentation tank 503 which are connected in series. An aeration member is provided in the coagulation tank 501. Each of the primary sedimentation tank 502 and the secondary sedimentation tank 503 is a vertical pipe sedimentation tank, and a honeycomb vertical flow pipe is provided in the vertical pipe sedimentation tank. The biochemical reaction pool 60 includes anoxic tank 601, aerobic tank 602, settling tank 603, and clean water tank 604 which are connected in series. A biological packing is fixed in each of the anoxic tank 601 and the aerobic tank 602, and an aeration member is provided in the aerobic tank 602. The biochemical reaction pool 60 further includes mixed liquid return pump 605 and sludge return pump 606. The aerobic tank 602 of the biochemical reaction pool 60 communicates with the anoxic tank 601 of the biochemical reaction pool 60 through a mixed liquid return pipe via the mixed liquid return pump 605; the settling tank 603 of the biochemical reaction pool 60 communicates with the anoxic tank 601 of the biochemical reaction pool 60 through a sludge return pipe via the sludge return pump 606.

The adjusting pool 10 communicates with a water inlet of the first-stage reactor 20 through a pipe fitting, a water outlet of the first-stage reactor 20 communicates with a water inlet of the second-stage reactor 30 through a pipe fitting, a water outlet of the second-stage reactor 30 communicates with a water inlet of the third-stage reactor 40 through a pipe fitting, a water outlet of the third-stage reactor 40 communicates with a water inlet of the coagulation sedimentation pool 50 through a pipe fitting, and a water outlet of the coagulation sedimentation pool 50 communicates with a water inlet of the biochemical reaction pool 60 through a pipe fitting. The aeration blower 70 communicates with an aeration member provided in each of the first-stage reactor 20, the third-stage reactor 40, the coagulation tank 501 of each stage of the coagulation sedimentation pool 50, and the aerobic tank 602 of the biochemical reaction pool 60 through a pipe fitting. The sludge filter press 80 communicates with each stage of the coagulation sedimentation pool 50 and the settling tank 603 of the biochemical reaction pool 60 through pipe fittings.

A flow is pushed through the first-stage reactor 20, the second-stage reactor 30, the third-stage reactor 40, the coagulation sedimentation pool 50, and the biochemical reaction pool 60 based on liquid level differences among the first-stage reactor 20, the second-stage reactor 30, the third-stage reactor 40, the coagulation sedimentation pool 50, and the biochemical reaction pool 60.

Example 8: Structure of an Integrated Device for Treating Toxic and Refractory Wastewater The structure of the integrated device for treating toxic and refractory wastewater in this example is basically the same as the structure of the integrated device in Example 7, except that: Each of the first-stage reactor 20 and the third-stage reactor 30 is the advanced oxidation reactor in Example 2, and the coagulation sedimentation pool 50 includes 3 stages.

Example 9: Structure of an Integrated Device for Treating Toxic and Refractory Wastewater The structure of the integrated device for treating toxic and refractory wastewater in this example is basically the same as the structure of the integrated device in Example 7, except that: Each of the first-stage reactor 20 and the third-stage reactor 40 is the advanced oxidation reactor in Example 3, the second-stage reactor 30 is the Fenton reactor in Example 6, and the coagulation sedimentation pool 50 includes 4 stages.

Example 10: Structure of an Integrated Device for Treating Toxic and Refractory Wastewater The structure of the integrated device for treating toxic and refractory wastewater in this example is basically the same as the structure of the integrated device in Example 7, except that: Each of the first-stage reactor 20 and the third-stage reactor 30 is the advanced oxidation reactor in Example 3, and the second-stage reactor 40 is the Fenton reactor in Example 6.

Example 11: Structure of an Integrated Device for Treating Toxic and Refractory Wastewater The structure of the integrated device for treating toxic and refractory wastewater in this example is basically the same as the structure of the integrated device in Example 7, except that: Each of the first-stage reactor 20 and the third-stage reactor 40 is the advanced oxidation reactor in Example 4, the second-stage reactor 30 is the Fenton reactor in Example 5, and the coagulation sedimentation pool 50 includes 2 stages.

Example 12: Wastewater Treatment Method

In this example, the integrated device for treating toxic and refractory wastewater in Example 7 was used in combination with agent-feeding devices to treat wastewater derived from dinitrodiazophenol (DDNP) production in a detonator plant, and the wastewater had the following characteristics: COD concentration: 1,500 mg/L, biochemical oxygen demand (BOD) concentration: 0 mg/L, and chromaticity magnification: 15,000. Agent-feeding pipes of the integrated device for treating toxic and refractory wastewater were connected to agent-feeding devices. Specific treatment steps were as follows:

(1) The pH of wastewater in the adjusting pool was adjusted to 2, and the wastewater in the adjusting pool was continuously pumped into the first-stage reactor. When the liquid level of wastewater in the first-stage reactor was higher than the first returned water outlet of the first reaction tank, a micro-scale zero-valent iron particle was added to the first-stage reactor at an amount of 20 g per liter of an effective volume of the first-stage reactor. Aeration was started and the first return pump was turned on, such that the zero-valent iron particle in the first-stage reactor was in a fluidized state due to aeration and wastewater return to allow a wastewater treatment, where an HRT of the wastewater in the first-stage reactor was controlled at 40 min.

(2) Wastewater treated by the first-stage reactor was allowed to continuously enter the second-stage reactor through the second water outlet of the first-stage reactor. When the liquid level of wastewater in the second-stage reactor was higher than the second returned water outlet of the second reaction tank, the sulfuric acid-feeding pump and the hydrogen peroxide-feeding pump were turned on to add sulfuric acid and hydrogen peroxide to the second-stage reactor, such that the concentration of hydrogen peroxide in the second-stage reactor was adjusted to 20 mmol/L and the pH of the wastewater was adjusted to 3. Wastewater return was conducted to allow the wastewater in the second-stage reactor to be in a swirling state to conduct a wastewater treatment, where an HRT of the wastewater in the second-stage reactor was controlled at 40 min.

(3) Wastewater treated by the second-stage reactor was allowed to continuously enter the third-stage reactor through the third water outlet of the second-stage reactor. When the liquid level of wastewater in the third-stage reactor was higher than the first returned water outlet of the first reaction tank, a micro-scale zero-valent iron particle was added to the third-stage reactor at an amount of 20 g per liter of an effective volume of the third-stage reactor. Aeration was started and the first return pump was turned on, such that the zero-valent iron particle in the third-stage reactor was in a fluidized state due to wastewater return to allow a wastewater treatment, where an HRT of the wastewater in the third-stage reactor was controlled at 40 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agent PAM and the 40 wt. % sodium hydroxide were added to the coagulation tank, and aeration was conducted. The mixed liquid generated in the coagulation tank was allowed to continuously enter a primary sedimentation tank, and wastewater treated by the primary sedimentation tank was allowed to continuously enter a secondary sedimentation tank. Wastewater treated by the secondary sedimentation tank of the first-stage coagulation sedimentation pool was allowed to enter a coagulation tank of a second-stage coagulation sedimentation pool. The above operations of adding the flocculating agent PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 60 min, and the pH in a coagulation tank of each stage of the coagulation sedimentation pool was controlled at 7.5 to 8.5.

(5) Wastewater treated by the coagulation sedimentation pool was allowed to continuously enter the anoxic tank of the biochemical reaction pool from the secondary sedimentation tank of the second-stage coagulation sedimentation pool. Wastewater treated by the anoxic tank was allowed to continuously enter the aerobic tank, and the aerobic tank was aerated to conduct treatment. Wastewater treated by the aerobic tank was allowed to continuously enter the settling tank, and wastewater treated by the settling tank was allowed to continuously enter the clean water tank. An effluent that met emission standards was discharged, where biological packing was fixed in each of the anoxic tank and the aerobic tank. A DO concentration of wastewater in the anoxic tank was controlled at 0.2 mg/L, the pH of the wastewater was controlled at 6.5, and an HRT of the wastewater in the anoxic tank was controlled at 90 min. A DO concentration of wastewater in the aerobic tank was controlled at 2 mg/L, the pH of the wastewater was controlled at 7, and an HRT of the wastewater in the aerobic tank was controlled at 200 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 100%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 40 mg/L, a BOD concentration of 10 mg/L, and a chromaticity magnification reduced to 70 or less, indicating that toxic and refractory pollutants in the wastewater were completely degraded and transformed, and the effluent could stably meet the emission standards of relevant industries.

Example 13: Wastewater Treatment Method

In this example, the integrated device for treating toxic and refractory wastewater in Example 7 was used in combination with agent-feeding devices to treat wastewater derived from DDNP production in a detonator plant, and the wastewater had the following characteristics: COD concentration of 4,500 mg/L, BOD concentration of 0 mg/L, and chromaticity magnification of 50,000. Agent-feeding pipes of the integrated device for treating toxic and refractory wastewater were connected to agent-feeding devices. Specific treatment steps were as follows:

(1) A pH of wastewater in the adjusting pool was adjusted to 2.5, and the wastewater in the adjusting pool was continuously pumped into the first-stage reactor. When the liquid level of wastewater in the first-stage reactor was higher than the first returned water outlet of the first reaction tank, a micro-scale zero-valent iron particle was added to the first-stage reactor at an amount of 30 g per liter of an effective volume of the first-stage reactor. Aeration was started and the first return pump was turned on, such that the zero-valent iron particle in the first-stage reactor was in a fluidized state due to aeration and wastewater return to allow a wastewater treatment, where an HRT of the wastewater in the first-stage reactor was controlled at 60 min.

(2) Wastewater treated by the first-stage reactor was allowed to continuously enter the second-stage reactor through the second water outlet of the first-stage reactor. When the liquid level of wastewater in the second-stage reactor was higher than the second returned water outlet of the second reaction tank, the sulfuric acid-feeding pump and the hydrogen peroxide-feeding pump were turned on to add sulfuric acid and hydrogen peroxide to the second-stage reactor, such that the concentration of hydrogen peroxide in the second-stage reactor was adjusted to 40 mmol/L and the pH of the wastewater was adjusted to 3. Wastewater return was conducted to allow the wastewater in the second-stage reactor to be in a swirling state to conduct a wastewater treatment, where an HRT of the wastewater in the second-stage reactor was controlled at 60 min.

(3) Wastewater treated by the second-stage reactor was allowed to continuously enter the third-stage reactor through the third water outlet of the second-stage reactor. When the liquid level of wastewater in the third-stage reactor was higher than the first returned water outlet of the first reaction tank, a micro-scale zero-valent iron particle was added to the third-stage reactor at an amount of 30 g per liter of an effective volume of the third-stage reactor. Aeration was started and the first return pump was turned on, such that the zero-valent iron particle in the third-stage reactor was in a fluidized state due to wastewater return to allow a wastewater treatment, where an HRT of the wastewater in the third-stage reactor was controlled at 60 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agents PAM and PAC and the 40 wt. % sodium hydroxide were added to the coagulation tank, and aeration was conducted. The mixed liquid generated in the coagulation tank was allowed to continuously enter a primary sedimentation tank, and wastewater treated by the primary sedimentation tank was allowed to continuously enter a secondary sedimentation tank. Wastewater treated by the secondary sedimentation tank of the first-stage coagulation sedimentation pool was allowed to enter a coagulation tank of a second-stage coagulation sedimentation pool. The above operations of adding the flocculating agents PAM and PAC and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 80 min, and the pH in a coagulation tank of each stage of the coagulation sedimentation pool was controlled at 8 to 9.

(5) Wastewater treated by the coagulation sedimentation pool was allowed to continuously enter the anoxic tank of the biochemical reaction pool from the secondary sedimentation tank of the second-stage coagulation sedimentation pool. Wastewater treated by the anoxic tank was allowed to continuously enter the aerobic tank, and the aerobic tank was aerated to conduct treatment. Wastewater treated by the aerobic tank was allowed to continuously enter the settling tank. Wastewater treated by the settling tank was allowed to continuously enter the clean water tank. An effluent meeting emission standards was discharged, where biological packing was fixed in each of the anoxic tank and the aerobic tank. A DO concentration of wastewater in the anoxic tank was controlled at 0.4 mg/L, the pH of the wastewater was controlled at 7, and an HRT of the wastewater in the anoxic tank was controlled at 120 min. A DO concentration of wastewater in the aerobic tank was controlled at 4 mg/L, the pH of the wastewater was controlled at 7.5, and an HRT of the wastewater in the aerobic tank was controlled at 360 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 300%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the secondary sedimentation tank of the second-stage coagulation sedimentation pool was tested for water quality, and results showed that the effluent had a COD concentration of 500 mg/L, a BOD concentration of 300 mg/L, and a chromaticity magnification reduced to 70 or less.

An effluent from the clean water tank of the biochemical reaction pool was tested for water quality, and results showed that the effluent had a COD concentration of 70 mg/L, a BOD concentration of 15 mg/L, and a chromaticity magnification reduced to 70 or less, indicating that toxic and refractory pollutants in the wastewater were completely degraded and transformed, and the effluent could stably meet the emission standards of relevant industries.

Comparative Example 1: Wastewater Treatment with the Method of CN104876319A in Example 8

In this comparative example, the method of CN104876319A in Example 8 was used to treat wastewater derived from DDNP production described in Example 13, where a micro-scale MEM used in wastewater treatment was a micro-scale zero-valent iron particle, and the wastewater had the following characteristics: COD concentration of 4,500 mg/L, BOD concentration of 0 mg/L, and chromaticity magnification of 50,000.

After the wastewater from DDNP production was treated by the method of CN104876319A in Example 8, an effluent from a fourth-stage coagulation sedimentation pool was tested for water quality, and results showed that the effluent had a COD concentration of 800 mg/L, a BOD concentration of 400 mg/L, and a chromaticity magnification reduced to 100 or less.

It can be seen from the comparison between Example 13 and Comparative Example 1 that the effluent obtained after treatment by the five stages of reactors and the four stages of coagulation sedimentation pools in Comparative Example 1 has a lower water quality than the effluent obtained after treatment by the three stages of reactors and the two stages of coagulation sedimentation pools in Example 13, indicating that the method of the present disclosure can further enhance the wastewater treatment effect.

Example 14: Wastewater treatment method

In this example, the integrated device for treating toxic and refractory wastewater in Example 8 was used in combination with agent-feeding devices to treat the explosive wastewater, and the wastewater had the following characteristics: COD concentration of 9,500 mg/L, BOD concentration of 0 mg/L, and chromaticity magnification of 30,000. Agent-feeding pipes of the integrated device for treating toxic and refractory wastewater were connected to agent-feeding devices. Specific treatment steps were as follows:

(1) The pH of wastewater in the adjusting pool was adjusted to 2, and the wastewater in the adjusting pool was continuously pumped into the first-stage reactor. When the liquid level of wastewater in the first-stage reactor was higher than the first returned water outlet of the first reaction tank, a micro-scale zero-valent iron particle was added to the first-stage reactor at an amount of 30 g per liter of an effective volume of the first-stage reactor. Aeration was started and the first return pump was turned on, such that the zero-valent iron particle in the first-stage reactor was in a fluidized state due to aeration and wastewater return to allow a wastewater treatment, where an HRT of the wastewater in the first-stage reactor was controlled at 90 min.

(2) Wastewater treated by the first-stage reactor was allowed to continuously enter the second-stage reactor through the second water outlet of the first-stage reactor. When the liquid level of wastewater in the second-stage reactor was higher than the second returned water outlet of the second reaction tank, the sulfuric acid-feeding pump and the hydrogen peroxide-feeding pump were turned on to add sulfuric acid and hydrogen peroxide to the second-stage reactor, such that the concentration of hydrogen peroxide in the second-stage reactor was adjusted to 40 mmol/L and the pH of the wastewater was adjusted to 3. Wastewater return was conducted to allow the wastewater in the second-stage reactor to be in a swirling state to conduct a wastewater treatment, where an HRT of the wastewater in the second-stage reactor was controlled at 90 min.

(3) Wastewater treated by the second-stage reactor was allowed to continuously enter the third-stage reactor through the third water outlet of the second-stage reactor. When the liquid level of wastewater in the third-stage reactor was higher than the first returned water outlet of the first reaction tank, a micro-scale zero-valent iron particle was added to the third-stage reactor at an amount of 30 g per liter of an effective volume of the third-stage reactor. Aeration was started and the first return pump was turned on, such that the zero-valent iron particle in the third-stage reactor was in a fluidized state due to wastewater return to allow a wastewater treatment, where an HRT of the wastewater in the third-stage reactor was controlled at 90 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agent PAM and the 40 wt. % sodium hydroxide were added to the coagulation tank, and aeration was conducted. The mixed liquid generated in the coagulation tank was allowed to continuously enter a primary sedimentation tank, and wastewater treated by the primary sedimentation tank was allowed to continuously enter a secondary sedimentation tank. Wastewater treated by the secondary sedimentation tank of the first-stage coagulation sedimentation pool was allowed to enter a coagulation tank of a second-stage coagulation sedimentation pool. The above operations of adding the flocculating agent PAM and the sodium hydroxide, aerating, and allowing wastewater to enter a primary sedimentation tank and a secondary sedimentation tank were repeated. Wastewater treated by the secondary sedimentation tank of the second-stage coagulation sedimentation pool was allowed to enter a coagulation tank of a third-stage coagulation sedimentation pool. The above operations of adding the flocculating agent PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 120 min, and a pH in a coagulation tank of each stage of the coagulation sedimentation pool was controlled at 8.5 to 9.5.

(5) Wastewater treated by the coagulation sedimentation pool was allowed to continuously enter the anoxic tank of the biochemical reaction pool from the secondary sedimentation tank of the second-stage coagulation sedimentation pool; wastewater treated by the anoxic tank was allowed to continuously enter the aerobic tank, and the aerobic tank was aerated to conduct a treatment; wastewater treated by the aerobic tank was allowed to continuously enter the settling tank; and wastewater treated by the settling tank was allowed to continuously enter the clean water tank, and an effluent meeting emission standards was discharged, where a biological packing was fixed in each of the anoxic tank and the aerobic tank; a DO concentration of wastewater in the anoxic tank was controlled at 0.5 mg/L, and a pH of the wastewater was controlled at 7.5; an HRT of the wastewater in the anoxic tank was controlled at 120 min; a DO concentration of wastewater in the aerobic tank was controlled at 4 mg/L, and a pH of the wastewater was controlled at 8; and an HRT of the wastewater in the aerobic tank was controlled at 360 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 100% and a mixed liquid return ratio was 400%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 40 mg/L, a BOD concentration of 10 mg/L, and a chromaticity magnification reduced to 70 or less, indicating that toxic and refractory pollutants in the wastewater were completely degraded and transformed, and the effluent could stably meet the emission standards of relevant industries.

Example 15: Wastewater Treatment Method

In this example, the integrated device for treating toxic and refractory wastewater in Example 8 was used in combination with agent-feeding devices to treat the explosive wastewater, and the wastewater had the following characteristics: COD concentration: 21,000 mg/L, BOD concentration: 0 mg/L, and chromaticity magnification: 50,000. Agent-feeding pipes of the integrated device for treating toxic and refractory wastewater were connected to agent-feeding devices, respectively. Specific treatment steps were as follows:

(1) A pH of wastewater in the adjusting pool was adjusted to 2, and the wastewater in the adjusting pool was continuously pumped into the first-stage reactor; when a liquid level of wastewater in the first-stage reactor was higher than the first returned water outlet of the first reaction tank, a micro-scale zero-valent iron particle was added to the first-stage reactor at an amount of 40 g per liter of an effective volume of the first-stage reactor; and aeration was started and the first return pump was turned on, such that the zero-valent iron particle in the first-stage reactor was in a fluidized state due to aeration and wastewater return to allow a wastewater treatment, where an HRT of the wastewater in the first-stage reactor was controlled at 120 min.

(2) Wastewater treated by the first-stage reactor was allowed to continuously enter the second-stage reactor through the second water outlet of the first-stage reactor; when a liquid level of wastewater in the second-stage reactor was higher than the second returned water outlet of the second reaction tank, a sulfuric acid-feeding pump and a hydrogen peroxide-feeding pump were turned on to add sulfuric acid and hydrogen peroxide to the second-stage reactor, such that a concentration of hydrogen peroxide in the second-stage reactor was adjusted to 60 mmol/L and a pH of the wastewater was adjusted to 3; and wastewater return was conducted to allow the wastewater in the second-stage reactor to be in a swirling state to conduct a wastewater treatment, where an HRT of the wastewater in the second-stage reactor was controlled at 120 min.

(3) Wastewater treated by the second-stage reactor was allowed to continuously enter the third-stage reactor through the third water outlet of the second-stage reactor; when a liquid level of wastewater in the third-stage reactor was higher than the first returned water outlet of the first reaction tank, a micro-scale zero-valent iron particle was added to the third-stage reactor at an amount of 40 g per liter of an effective volume of the third-stage reactor; and aeration was started and the first return pump was turned on, such that the zero-valent iron particle in the third-stage reactor was in a fluidized state due to wastewater return to allow a wastewater treatment, where an HRT of the wastewater in the third-stage reactor was controlled at 120 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agents PAS and PAM and the 40 wt. % sodium hydroxide were added to the coagulation tank, and aeration was conducted; a mixed liquid generated in the coagulation tank was allowed to continuously enter a primary sedimentation tank, and wastewater treated by the primary sedimentation tank was allowed to continuously enter a secondary sedimentation tank; wastewater treated by the secondary sedimentation tank of the first-stage coagulation sedimentation pool was allowed to enter a coagulation tank of a second-stage coagulation sedimentation pool. The above operations of adding the flocculating agents PAS and PAM and the sodium hydroxide, aerating, and allowing wastewater to enter a primary sedimentation tank and a secondary sedimentation tank were repeated; and wastewater treated by the secondary sedimentation tank of the second-stage coagulation sedimentation pool was allowed to enter a coagulation tank of a third-stage coagulation sedimentation pool. The above operations of adding the flocculating agents PAS and PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 120 min, and a pH in a coagulation tank of each stage of the coagulation sedimentation pool was controlled at 9 to 10.

(5) Wastewater treated by the coagulation sedimentation pool was allowed to continuously enter the anoxic tank of the biochemical reaction pool from the secondary sedimentation tank of the second-stage coagulation sedimentation pool; wastewater treated by the anoxic tank was allowed to continuously enter the aerobic tank, and the aerobic tank was aerated to conduct a treatment; wastewater treated by the aerobic tank was allowed to continuously enter the settling tank; and wastewater treated by the settling tank was allowed to continuously enter the clean water tank, and an effluent meeting emission standards was discharged, where a biological packing was fixed in each of the anoxic tank and the aerobic tank; a DO concentration of wastewater in the anoxic tank was controlled at 0.4 mg/L, and a pH of the wastewater was controlled at 7; an HRT of the wastewater in the anoxic tank was controlled at 150 min; a DO concentration of wastewater in the aerobic tank was controlled at 4 mg/L, and a pH of the wastewater was controlled at 7.5; and an HRT of the wastewater in the aerobic tank was controlled at 390 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 60% and a mixed liquid return ratio was 350%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 90 mg/L, a BOD concentration of 20 mg/L, and a chromaticity magnification reduced to 70 or less, indicating that toxic and refractory pollutants in the wastewater were completely degraded and transformed, and the effluent could stably meet the emission standards of relevant industries.

Example 16: Wastewater Treatment Method

In this example, the integrated device for treating toxic and refractory wastewater in Example 11 was used in combination with agent-feeding devices to treat wastewater derived from NHN initiating explosive production, and the wastewater had the following characteristics: COD concentration: 6,500 mg/L, BOD concentration: 0 mg/L, and chromaticity magnification: Agent-feeding pipes of the integrated device for treating toxic and refractory wastewater were connected to agent-feeding devices, respectively. Specific treatment steps were as follows:

(1) A pH of wastewater in the adjusting pool was adjusted to 3, and the wastewater in the adjusting pool was continuously pumped into the first-stage reactor; when a liquid level of wastewater in the first-stage reactor was higher than the first returned water outlet of the first reaction tank, a micro-scale iron-copper bimetallic particle was added to the first-stage reactor at an amount of 25 g per liter of an effective volume of the first-stage reactor; and aeration was started and the first return pump was turned on, such that the iron-copper bimetallic particle in the first-stage reactor was in a fluidized state due to aeration and wastewater return to allow a wastewater treatment, where an HRT of the wastewater in the first-stage reactor was controlled at 90 min.

(2) Wastewater treated by the first-stage reactor was allowed to continuously enter the second-stage reactor through the second water outlet of the first-stage reactor; when a liquid level of wastewater in the second-stage reactor was higher than the second returned water outlet of the second reaction tank, a sulfuric acid-feeding pump and a hydrogen peroxide-feeding pump were turned on to add sulfuric acid and hydrogen peroxide to the second-stage reactor, such that a concentration of hydrogen peroxide in the second-stage reactor was adjusted to 40 mmol/L and a pH of the wastewater was adjusted to 3; and wastewater return was conducted to allow the wastewater in the second-stage reactor to be in a swirling state to conduct a wastewater treatment, where an HRT of the wastewater in the second-stage reactor was controlled at 90 min.

(3) Wastewater treated by the second-stage reactor was allowed to continuously enter the third-stage reactor through the third water outlet of the second-stage reactor; when a liquid level of wastewater in the third-stage reactor was higher than the first returned water outlet of the first reaction tank, a micro-scale iron-copper bimetallic particle was added to the third-stage reactor at an amount of 25 g per liter of an effective volume of the third-stage reactor; and aeration was started and the first return pump was turned on, such that the iron-copper bimetallic particle in the third-stage reactor was in a fluidized state due to wastewater return to allow a wastewater treatment, where an HRT of the wastewater in the third-stage reactor was controlled at 90 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agents PFS and PAM and the 45 wt. % sodium hydroxide were added to the coagulation tank, and aeration was conducted; a mixed liquid generated in the coagulation tank was allowed to continuously enter a primary sedimentation tank, and wastewater treated by the primary sedimentation tank was allowed to continuously enter a secondary sedimentation tank; and wastewater treated by the secondary sedimentation tank of the first-stage coagulation sedimentation pool was allowed to enter a coagulation tank of a second-stage coagulation sedimentation pool. The above operations of adding the flocculating agents PFS and PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 90 min, and a pH in a coagulation tank of each stage of the coagulation sedimentation pool was controlled at 8 to 9.

(5) Wastewater treated by the coagulation sedimentation pool was allowed to continuously enter the anoxic tank of the biochemical reaction pool from the secondary sedimentation tank of the second-stage coagulation sedimentation pool; wastewater treated by the anoxic tank was allowed to continuously enter the aerobic tank, and the aerobic tank was aerated to conduct a treatment; wastewater treated by the aerobic tank was allowed to continuously enter the settling tank; and wastewater treated by the settling tank was allowed to continuously enter the clean water tank, and an effluent meeting emission standards was discharged, where a biological packing was fixed in each of the anoxic tank and the aerobic tank; a DO concentration of wastewater in the anoxic tank was controlled at 0.4 mg/L, and a pH of the wastewater was controlled at 7; an HRT of the wastewater in the anoxic tank was controlled at 120 min; a DO concentration of wastewater in the aerobic tank was controlled at 4 mg/L, and a pH of the wastewater was controlled at 7.5; and an HRT of the wastewater in the aerobic tank was controlled at 240 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 300%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 30 mg/L, a BOD concentration of 10 mg/L, and a chromaticity magnification reduced to 70 or less, indicating that toxic and refractory pollutants in the wastewater were completely degraded and transformed, and the effluent could stably meet the emission standards of relevant industries.

Example 17: Wastewater Treatment Method

In this example, the integrated device for treating toxic and refractory wastewater in Example 10 was used in combination with agent-feeding devices to treat wastewater derived from dye intermediate production, and the wastewater had the following characteristics: COD concentration: 9,500 mg/L, BOD concentration: 10 mg/L to 150 mg/L, and chromaticity magnification: 10,000. Agent-feeding pipes of the integrated device for treating toxic and refractory wastewater were connected to agent-feeding devices, respectively. Specific treatment steps were as follows:

(1) A pH of wastewater in the adjusting pool was adjusted to 2, and the wastewater in the adjusting pool was continuously pumped into the first-stage reactor; when a liquid level of wastewater in the first-stage reactor was higher than the first returned water outlet of the first reaction tank, a micro-scale iron-palladium bimetallic particle was added to the first-stage reactor at an amount of 40 g per liter of an effective volume of the first-stage reactor; and aeration was started and the first return pump was turned on, such that the iron-palladium bimetallic particle in the first-stage reactor was in a fluidized state due to aeration and wastewater return to allow a wastewater treatment, where an HRT of the wastewater in the first-stage reactor was controlled at 90 min.

(2) Wastewater treated by the first-stage reactor was allowed to continuously enter the second-stage reactor through the second water outlet of the first-stage reactor; when a liquid level of wastewater in the second-stage reactor was higher than the second returned water outlet of the second reaction tank, a sulfuric acid-feeding pump and a hydrogen peroxide-feeding pump were turned on to add sulfuric acid and hydrogen peroxide to the second-stage reactor, such that a concentration of hydrogen peroxide in the second-stage reactor was adjusted to 60 mmol/L and a pH of the wastewater was adjusted to 3; and wastewater return was conducted to allow the wastewater in the second-stage reactor to be in a swirling state to conduct a wastewater treatment, where an HRT of the wastewater in the second-stage reactor was controlled at 90 min.

(3) Wastewater treated by the second-stage reactor was allowed to continuously enter the third-stage reactor through the third water outlet of the second-stage reactor; when a liquid level of wastewater in the third-stage reactor was higher than the first returned water outlet of the first reaction tank, a micro-scale iron-palladium bimetallic particle was added to the third-stage reactor at an amount of 40 g per liter of an effective volume of the third-stage reactor; and aeration was started and the first return pump was turned on, such that the iron-palladium bimetallic particle in the third-stage reactor was in a fluidized state due to wastewater return to allow a wastewater treatment, where an HRT of the wastewater in the third-stage reactor was controlled at 90 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agents PFC and PAM and the 40 wt. % sodium hydroxide were added to the coagulation tank, and aeration was conducted; a mixed liquid generated in the coagulation tank was allowed to continuously enter a primary sedimentation tank, and wastewater treated by the primary sedimentation tank was allowed to continuously enter a secondary sedimentation tank; and wastewater treated by the secondary sedimentation tank of the first-stage coagulation sedimentation pool was allowed to enter a coagulation tank of a second-stage coagulation sedimentation pool. The above operations of adding the flocculating agents PFC and PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 60 min, and a pH in a coagulation tank of each stage of the coagulation sedimentation pool was controlled at 8.5 to 9.5.

(5) Wastewater treated by the coagulation sedimentation pool was allowed to continuously enter the anoxic tank of the biochemical reaction pool from the secondary sedimentation tank of the second-stage coagulation sedimentation pool; wastewater treated by the anoxic tank was allowed to continuously enter the aerobic tank, and the aerobic tank was aerated to conduct a treatment; wastewater treated by the aerobic tank was allowed to continuously enter the settling tank; and wastewater treated by the settling tank was allowed to continuously enter the clean water tank, and an effluent meeting emission standards was discharged, where a biological packing was fixed in each of the anoxic tank and the aerobic tank; a DO concentration of wastewater in the anoxic tank was controlled at 0.4 mg/L, and a pH of the wastewater was controlled at 7; an HRT of the wastewater in the anoxic tank was controlled at 100 min; a DO concentration of wastewater in the aerobic tank was controlled at 4 mg/L, and a pH of the wastewater was controlled at 7.5; and an HRT of the wastewater in the aerobic tank was controlled at 200 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 300%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 50 mg/L, a BOD concentration of 20 mg/L, and a chromaticity magnification reduced to 100 or less, indicating that toxic and refractory pollutants in the wastewater were completely degraded and transformed, and the effluent could stably meet the emission standards of relevant industries.

Example 18: Wastewater Treatment Method

In this example, the integrated device for treating toxic and refractory wastewater in Example 8 was used in combination with agent-feeding devices to treat wastewater derived from pharmaceutical production, and the wastewater had the following characteristics: COD concentration: 35,000 mg/L, BOD concentration: 500 mg/L to 1,000 mg/L, and chromaticity magnification: 20,000. Agent-feeding pipes of the integrated device for treating toxic and refractory wastewater were connected to agent-feeding devices, respectively. Specific treatment steps were as follows:

(1) A pH of wastewater in the adjusting pool was adjusted to 2, and the wastewater in the adjusting pool was continuously pumped into the first-stage reactor; when a liquid level of wastewater in the first-stage reactor was higher than the first returned water outlet 1-17 of the first reaction tank, a micro-scale iron-nickel bimetallic particle was added to the first-stage reactor at an amount of 80 g per liter of an effective volume of the first-stage reactor; and aeration was started and the first return pump was turned on, such that the iron-nickel bimetallic particle in the first-stage reactor was in a fluidized state due to aeration and wastewater return to allow a wastewater treatment, where an HRT of the wastewater in the first-stage reactor was controlled at 160 min.

(2) Wastewater treated by the first-stage reactor was allowed to continuously enter the second-stage reactor through the second water outlet of the first-stage reactor; when a liquid level of wastewater in the second-stage reactor was higher than the second returned water outlet of the second reaction tank, a sulfuric acid-feeding pump and a hydrogen peroxide-feeding pump were turned on to add sulfuric acid and hydrogen peroxide to the second-stage reactor, such that a concentration of hydrogen peroxide in the second-stage reactor was adjusted to 120 mmol/L and a pH of the wastewater was adjusted to 3; and wastewater return was conducted to allow the wastewater in the second-stage reactor to be in a swirling state to conduct a wastewater treatment, where an HRT of the wastewater in the second-stage reactor was controlled at 160 min.

(3) Wastewater treated by the second-stage reactor was allowed to continuously enter the third-stage reactor through the third water outlet of the second-stage reactor; when a liquid level of wastewater in the third-stage reactor was higher than the first returned water outlet of the first reaction tank, a micro-scale iron-nickel bimetallic particle was added to the third-stage reactor at an amount of 40 g per liter of an effective volume of the third-stage reactor; and aeration was started and the first return pump was turned on, such that the iron-nickel bimetallic particle in the third-stage reactor was in a fluidized state due to wastewater return to allow a wastewater treatment, where an HRT of the wastewater in the third-stage reactor was controlled at 160 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agent PAM and the 40 wt. % sodium hydroxide were added to the coagulation tank, and aeration was conducted; a mixed liquid generated in the coagulation tank was allowed to continuously enter a primary sedimentation tank, and wastewater treated by the primary sedimentation tank was allowed to continuously enter a secondary sedimentation tank; wastewater treated by the secondary sedimentation tank of the first-stage coagulation sedimentation pool was allowed to enter a coagulation tank of a second-stage coagulation sedimentation pool. The above operations of adding the flocculating agent PAM and the sodium hydroxide, aerating, and allowing wastewater to enter a primary sedimentation tank and a secondary sedimentation tank were repeated; and wastewater treated by the secondary sedimentation tank of the second-stage coagulation sedimentation pool was allowed to enter a coagulation tank of a third-stage coagulation sedimentation pool. The above operations of adding the flocculating agent PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 240 min, and a pH in a coagulation tank of each stage of the coagulation sedimentation pool was controlled at 8.5 to 9.5.

(5) Wastewater treated by the coagulation sedimentation pool was allowed to continuously enter the anoxic tank of the biochemical reaction pool from the secondary sedimentation tank of the second-stage coagulation sedimentation pool; wastewater treated by the anoxic tank was allowed to continuously enter the aerobic tank, and the aerobic tank was aerated to conduct a treatment; wastewater treated by the aerobic tank was allowed to continuously enter the settling tank; and wastewater treated by the settling tank was allowed to continuously enter the clean water tank, and an effluent meeting emission standards was discharged, where a biological packing was fixed in each of the anoxic tank and the aerobic tank; a DO concentration of wastewater in the anoxic tank was controlled at 0.4 mg/L, and a pH of the wastewater was controlled at 7; an HRT of the wastewater in the anoxic tank was controlled at 120 min; a DO concentration of wastewater in the aerobic tank was controlled at 4 mg/L, and a pH of the wastewater was controlled at 7.5; and an HRT of the wastewater in the aerobic tank was controlled at 240 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 300%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 100 mg/L, a BOD concentration of 15 mg/L, and a chromaticity magnification reduced to 100 or less, indicating that toxic and refractory pollutants in the wastewater were completely degraded and transformed, and the effluent could stably meet the emission standards of relevant industries.

Example 19: Wastewater Treatment Method

In this example, the integrated device for treating toxic and refractory wastewater in Example 8 was used in combination with agent-feeding devices to treat wastewater derived from pesticide production, and the wastewater had the following characteristics: COD concentration: 23,000 mg/L, BOD concentration: 500 mg/L to 1,000 mg/L, and chromaticity magnification: 50,000. Agent-feeding pipes of the integrated device for treating toxic and refractory wastewater were connected to agent-feeding devices, respectively. Specific treatment steps were as follows:

(1) A pH of wastewater in the adjusting pool was adjusted to 2, and the wastewater in the adjusting pool was continuously pumped into the first-stage reactor; when a liquid level of wastewater in the first-stage reactor was higher than the first returned water outlet of the first reaction tank, a micro-scale zero-valent iron particle was added to the first-stage reactor at an amount of 80 g per liter of an effective volume of the first-stage reactor; and aeration was started and the first return pump was turned on, such that the zero-valent iron particle in the first-stage reactor was in a fluidized state due to aeration and wastewater return to allow a wastewater treatment, where an HRT of the wastewater in the first-stage reactor was controlled at 160 min.

(2) Wastewater treated by the first-stage reactor was allowed to continuously enter the second-stage reactor through the second water outlet of the first-stage reactor; when a liquid level of wastewater in the second-stage reactor was higher than the second returned water outlet of the second reaction tank, a sulfuric acid-feeding pump and a hydrogen peroxide-feeding pump were turned on to add sulfuric acid and hydrogen peroxide to the second-stage reactor, such that a concentration of hydrogen peroxide in the second-stage reactor was adjusted to 120 mmol/L and a pH of the wastewater was adjusted to 3; and wastewater return was conducted to allow the wastewater in the second-stage reactor to be in a swirling state to conduct a wastewater treatment, where an HRT of the wastewater in the second-stage reactor was controlled at 160 min.

(3) Wastewater treated by the second-stage reactor was allowed to continuously enter the third-stage reactor through the third water outlet of the second-stage reactor 30; when a liquid level of wastewater in the third-stage reactor was higher than the first returned water outlet of the first reaction tank, a micro-scale zero-valent iron particle was added to the third-stage reactor at an amount of 50 g per liter of an effective volume of the third-stage reactor; and aeration was started and the first return pump was turned on, such that the zero-valent iron particle in the third-stage reactor was in a fluidized state due to wastewater return to allow a wastewater treatment, where an HRT of the wastewater in the third-stage reactor was controlled at 150 min.

(4) Wastewater treated by the third-stage reactor was allowed to continuously enter the coagulation sedimentation pool for a coagulation sedimentation treatment:

The wastewater treated by the third-stage reactor was allowed to continuously enter a coagulation tank of a first-stage coagulation sedimentation pool through the second water outlet of the third-stage reactor, the flocculating agents PAC and PAM and the 40 wt. % sodium hydroxide were added to the coagulation tank, and aeration was conducted; a mixed liquid generated in the coagulation tank was allowed to continuously enter a primary sedimentation tank, and wastewater treated by the primary sedimentation tank was allowed to continuously enter a secondary sedimentation tank; wastewater treated by the secondary sedimentation tank of the first-stage coagulation sedimentation pool was allowed to enter a coagulation tank of a second-stage coagulation sedimentation pool. The above operations of adding the flocculating agents PAC and PAM and the sodium hydroxide, aerating, and allowing wastewater to enter a primary sedimentation tank and a secondary sedimentation tank were repeated; and wastewater treated by the secondary sedimentation tank of the second-stage coagulation sedimentation pool was allowed to enter a coagulation tank of a third-stage coagulation sedimentation pool. The above operations of adding the flocculating agents PAC and PAM and the sodium hydroxide, aerating, and allowing wastewater to enter a primary sedimentation tank and a secondary sedimentation tank were repeated to effectively remove $Fe^{2+}$, $Fe^{3+}$, and produced flocs from the wastewater, where an HRT of the wastewater in the coagulation sedimentation pool was controlled at 360 min, and a pH in a coagulation tank of each stage of the coagulation sedimentation pool was controlled at 9 to 10.

(5) Wastewater treated by the coagulation sedimentation pool was allowed to continuously enter the anoxic tank of the biochemical reaction pool from the secondary sedimentation tank of the second-stage coagulation sedimentation pool. Wastewater treated by the anoxic tank was allowed to continuously enter the aerobic tank, and the aerobic tank was aerated to conduct treatment. Wastewater treated by the aerobic tank was allowed to continuously enter the settling tank. Wastewater treated by the settling tank was allowed to continuously enter the clean water tank. An effluent meeting emission standards was discharged, where a biological packing was fixed in each of the anoxic tank and the aerobic tank. A DO concentration of wastewater in the anoxic tank was controlled at 0.4 mg/L, the pH of the wastewater was controlled at 7, and an HRT of the wastewater in the anoxic tank was controlled at 120 min. A DO concentration of wastewater in the aerobic tank was controlled at 4 mg/L, the pH of the wastewater was controlled at 7.5, and an HRT of the wastewater in the aerobic tank was controlled at 360 min.

The mixed liquid in the aerobic tank of the biochemical reaction pool was returned to the anoxic tank of the biochemical reaction pool, and sludge in the settling tank of the biochemical reaction pool was returned to the anoxic tank of the biochemical reaction pool, where a sludge return ratio was 50% and a mixed liquid return ratio was 300%. Sludge produced in each stage of the coagulation sedimentation pool and excess sludge produced on the basis of meeting sludge return requirements in the settling tank of the biochemical reaction pool were collectively subjected to press filtration by the sludge filter press for dewatering.

An effluent from the clean water tank of the biochemical reaction pool was tested for water quality, and results showed that the effluent had a COD concentration of 80 mg/L, a BOD concentration of 20 mg/L, and a chromaticity magnification reduced to 100 or less, indicating that toxic and refractory pollutants in the wastewater were completely degraded and transformed, and the effluent could stably meet the emission standards of relevant industries.

What is claimed is:

1. A method for treating toxic and refractory wastewater, wherein the method employs an integrated device for treating toxic and refractory wastewater to perform a wastewater treatment, wherein the integrated device for treating toxic and refractory wastewater comprises an adjusting pool, a first-stage reactor, a second-stage reactor, a third-stage reactor, a coagulation sedimentation pool, a biochemical reaction pool and an aeration blower that are sequentially connected in series;

wherein each of the first-stage reactor and the third-stage reactor is an advanced oxidation reactor, and the second-stage reactor is a Fenton reactor; the coagulation sedimentation pool comprises 2 to 4 stages, wherein each stage of the coagulation sedimentation pool comprises a coagulation tank, a primary sedimentation tank, and a secondary sedimentation tank that are connected in series, and each of the primary sedimentation tank and the secondary sedimentation tank is a vertical pipe sedimentation tank; the biochemical reaction pool comprises an anoxic tank, an aerobic tank, a settling tank, and a clean water tank that are connected in series;

the adjusting pool communicates with a water inlet of the first-stage reactor through a pipe fitting, a water outlet of the first-stage reactor communicates with a water inlet of the second-stage reactor through a pipe fitting, a water outlet of the second-stage reactor communicates with a water inlet of the third-stage reactor through a pipe fitting, a water outlet of the third-stage reactor communicates with a water inlet of the coagulation sedimentation pool through a pipe fitting, and a water outlet of the coagulation sedimentation pool communicates with a water inlet of the biochemical reaction pool through a pipe fitting; the aeration blower communicates with an aeration member provided in each of the first-stage reactor, the third-stage reactor, the coagulation tank of each stage of the coagulation sedimentation pool, and the aerobic tank of the biochemical reaction pool through a pipe fitting; and a flow is pushed through the first-stage reactor, the second-stage reactor, the third-stage reactor, the coagulation sedimentation pool, and the biochemical reaction pool based on liquid level differences among the first-stage reactor, the second-stage reactor, the third-stage reactor, the coagulation sedimentation pool, and the biochemical reaction pool;

the advanced oxidation reactor comprises a first reaction tank, a first return pump, a first return pipe, a first bracket, a first conical baffle, an aeration disc, and a sedimentation tank provided with a vertical flow pipe; the first reaction tank comprises a first cylinder and a first ball crown; a height of the first ball crown is less than a radius of the first cylinder, and an inner diameter of the first cylinder is equal to an inner diameter of an open end of the first ball crown; an end of the first cylinder is connected to the open end of the first ball crown, and a lower flange is provided at a bottom of the first ball crown; the first conical baffle is located inside the first reaction tank; a bottom of the first conical baffle is open, and a vertex of the first conical baffle faces upward; a periphery of the bottom of the first conical baffle is provided with an upper flange, and an open end of the first conical baffle is connected to the lower flange by the upper flange through a screw; an axis of the first conical baffle and an axis of the first cylinder coincide with the height of the first ball crown; a cone angle of the first conical baffle is 40° to 100°, and a ratio of a height of the first conical baffle to a height of the reaction tank is 1:(6-15); the first cylinder is provided with a first agent-feeding port, a first water inlet, a first overflow port, a first returned water outlet, and a first water outlet the first ball crown is provided with a first returned water inlet and a first evacuation port; the first evacuation port is located on the first ball crown outside the first conical baffle and the first returned water inlet is located at a center of a top of the first ball crown; at least three first 90° elbows are horizontally provided on the first conical baffle at a same height level so that an inside of the first conical baffle communicates with an outside of the first conical baffle; a top of the first conical baffle is provided with an aeration disc, and an aeration pipe is connected to the aeration disc; the sedimentation tank is arranged on an outer side wall of the first cylinder, and a part of the outer side wall of the first cylinder also serves as an inner side wall of the sedimentation tank; an upper end of the sedimentation tank is open, the sedimentation tank has an inclined sedimentation tank bottom, and the sedimentation tank bottom is at an included angle of 15° to 60° with a vertical plane; the first water outlet is located at a junction between the sedimentation tank bottom and a side wall of the first cylinder so that the first reaction tank communicates with the sedimentation tank; a width of the first water outlet is equal to a length of an intersecting line between the sedimentation tank bottom and an outer wall of the first cylinder; an open height of the first water outlet is 10 mm to 200 mm, and the first water outlet is located at a lower part of the first cylinder; an upper part of the sedimentation tank is provided with a second water outlet a vertical flow pipe is provided in the sedimentation tank; the vertical flow pipe is flush up and down; a bottom of the vertical flow pipe is located above the sedimentation tank bottom, and a top of the vertical flow pipe is located below the second water outlet the first return pipe has one end connected to the first returned water outlet and the other end connected to the first returned water inlet the first return pump is located on the first return pipe, and the first bracket is connected to an outer wall of the first reaction tank so that the first reaction tank is perpendicular to a horizontal plane;

the Fenton reactor comprises a second reaction tank, a second return pump, a second return pipe, a second bracket, and a second conical baffle; the second reaction tank comprises a second cylinder and a second ball crown; a height of the second ball crown is less than a radius of the second cylinder, and an inner diameter of the second cylinder is equal to an inner diameter of an open end of the second ball crown; an end of the second cylinder is connected to the open end of the second ball crown; the second conical baffle is located inside the second reaction tank; a bottom of the second conical baffle is open, and a vertex of the second conical baffle faces upward; an open end of the second conical baffle is connected to an inner wall of the second ball crown; an axis of the second conical baffle and an axis of the second cylinder coincide with the height of the second ball crown; a cone angle of the second conical baffle is 40° to 100°, and a ratio of a height of the second conical baffle to a height of the second reaction tank is 1:(6-15); the second cylinder is provided with a second agent-feeding port, a second water inlet, a second overflow port, a second returned water outlet, and a third water outlet the second ball crown is provided with a second evacuation port, and the second evacuation port is located on the second ball crown outside the second conical baffle; at least three second 90° elbows are evenly and horizontally provided on the second ball crown at a same height level so that an inside of the second ball crown communicates with an outside of the second ball crown; an end face of each of the second 90° elbows located at an outer wall of the second conical baffle abuts an outer wall of the second conical baffle; the second return pipe has one end connected to the second returned water outlet and the other end connected to each of the second 90° elbows on the second ball crown through a branch pipe; the second return pump is located on the second return pipe; the second bracket is connected to an outer wall of the second reaction tank so that the second reaction tank is perpendicular to a horizontal plane;

the wastewater treatment comprises the following steps:
(1) adjusting a pH of the wastewater in the adjusting pool to 1 to 4, continuously pumping the wastewater in the adjusting pool into the first-stage reactor, adding a micro-scale MEM to the first-stage reactor, aerating, and allowing the micro-scale MEM in the first-stage reactor to be in a fluidized state through wastewater return to conduct a wastewater treatment, wherein a hydraulic retention time (HRT) of the wastewater in the first-stage reactor is controlled at 20 min to 180 min;
(2) allowing wastewater treated by the first-stage reactor to continuously enter the second-stage reactor, adding sulfuric acid and hydrogen peroxide to the second-stage reactor, adjusting a concentration of hydrogen peroxide in the second-stage reactor to 20 mmol/L to 200 mmol/L, adjusting a pH of the wastewater to 2 to 4, and allowing the wastewater in the second-stage reactor to be in a swirling state through wastewater return to conduct the wastewater treatment, wherein an HRT of the wastewater in the second-stage reactor is controlled at 20 min to 180 min;
(3) allowing wastewater treated by the second-stage reactor to continuously enter the third-stage reactor, adding the micro-scale MEM to the third-stage reactor, aerating, and allowing the micro-scale MEM in the third-stage reactor to be in the fluidized state through wastewater return to conduct the wastewater treatment, wherein an HRT of the wastewater in the third-stage reactor is controlled at 20 min to 180 min;
(4) allowing wastewater treated by the third-stage reactor to continuously enter the coagulation sedimentation pool for a coagulation sedimentation treatment by:
allowing the wastewater treated by the third-stage reactor to continuously enter a coagulation tank of a first-stage coagulation sedimentation pool, adding a flocculating agent and an inorganic alkali to the coagulation tank, aerating, allowing a mixed liquid generated in the coagulation tank to continuously enter a primary sedimentation tank, and allowing wastewater treated by the primary sedimentation tank to continuously enter a secondary sedimentation tank;
allowing wastewater treated by the secondary sedimentation tank of the first-stage coagulation sedimentation pool to enter a coagulation tank of a second-stage coagulation sedimentation pool, and repeating the above operations of adding the flocculating agent and the inorganic alkali, aerating, and allowing wastewater to enter a primary sedimentation tank and a secondary sedimentation tank until wastewater enters a secondary sedimentation tank of the last-stage coagulation sedimentation pool, wherein an HRT of the wastewater in the coagulation sedimentation pool is controlled at 20 min to 360 min; and (5) allowing wastewater treated by the coagulation sedimentation pool to continuously enter the anoxic tank of the biochemical reaction pool, allowing wastewater treated by the anoxic tank to continuously enter the aerobic tank, aerating the aerobic tank to conduct treatment, allowing wastewater treated by the aerobic tank to continuously enter the settling tank, allowing wastewater treated by the settling tank to continuously enter the clean water tank, and discharging an effluent meeting emission standards, wherein a biological packing is fixed in each of the anoxic tank and the aerobic tank, an HRT of the wastewater in the anoxic tank is controlled at 60 min to 600 min, and an HRT of the wastewater in the aerobic tank is controlled at 180 min to 1200 min.

2. The method for treating the toxic and refractory wastewater according to claim 1, wherein the biochemical reaction pool of the integrated device for treating the toxic and refractory wastewater further comprises a mixed liquid return pump and a sludge return pump; wherein the aerobic tank of the biochemical reaction pool communicates with the anoxic tank of the biochemical reaction pool through a mixed liquid return pipe via the mixed liquid return pump; and the settling tank of the biochemical reaction pool communicates with the anoxic tank of the biochemical reaction pool through a sludge return pipe via the sludge return pump.

3. The method for treating the toxic and refractory wastewater according to claim 1, wherein the integrated device for treating the toxic and refractory wastewater further comprises a sludge filter press, wherein the sludge filter press communicates with each stage of the coagulation sedimentation pool and the settling tank of the biochemical reaction pool through pipe fittings.

4. The method for treating the toxic and refractory wastewater according to claim 1, wherein in step (5), the mixed liquid in the aerobic tank of the biochemical reaction pool is returned to the anoxic tank of the biochemical reaction pool, and sludge in the settling tank of the biochemical reaction pool is returned to the anoxic tank of the biochemical reaction pool, wherein a sludge return ratio is 50% to 100% and a mixed liquid return ratio is 100% to 400%.

5. The method for treating the toxic and refractory wastewater according to claim 4, wherein the micro-scale MEM is a zero-valent iron particle, an iron-copper bimetallic particle, an iron-palladium bimetallic particle, or an iron-nickel bimetallic particle.

6. The method for treating the toxic and refractory wastewater according to claim 4, wherein the micro-scale MEM is added to the first-stage reactor or the third-stage reactor at an amount of 10 g to 200 g per liter of an effective volume of the first-stage reactor or the third-stage reactor.

7. The method for treating the toxic and refractory wastewater according to claim 4, wherein a pH in the coagulation tank of each stage of the coagulation sedimentation pool is controlled at 7.5 to 10.

8. The method for treating the toxic and refractory wastewater according to claim 1, wherein in step (5), for the wastewater in the anoxic tank, a dissolved oxygen (DO) concentration is controlled at 0.2 mg/L to 0.5 mg/L and a pH is controlled at 6.5 to 7.5; and for the wastewater in the aerobic tank, a DO concentration is controlled at 2 mg/L to 4 mg/L and a pH is controlled at 7 to 8.

9. The method for treating the toxic and refractory wastewater according to claim 8, wherein the micro-scale MEM is a zero-valent iron particle, an iron-copper bimetallic particle, an iron-palladium bimetallic particle, or an iron-nickel bimetallic particle.

10. The method for treating the toxic and refractory wastewater according to claim 8, wherein the micro-scale MEM is added to the first-stage reactor or the third-stage reactor at an amount of 10 g to 200 g per liter of an effective volume of the first-stage reactor or the third-stage reactor.

11. The method for treating the toxic and refractory wastewater according to claim 8, wherein a pH in the coagulation tank of each stage of the coagulation sedimentation pool is controlled at 7.5 to 10.

12. The method for treating the toxic and refractory wastewater according to claim 1, wherein the micro-scale MEM is a zero-valent iron particle, an iron-copper bimetallic particle, an iron-palladium bimetallic particle, or an iron-nickel bimetallic particle.

13. The method for treating the toxic and refractory wastewater according to claim 1, wherein the micro-scale MEM is added to the first-stage reactor or the third-stage reactor at an amount of 10 g to 200 g per liter of an effective volume of the first-stage reactor or the third-stage reactor.

14. The method for treating the toxic and refractory wastewater according to any one of claim 1, wherein a pH in the coagulation tank of each stage of the coagulation sedimentation pool is controlled at 7.5 to 10.

* * * * *